United States Patent Office 3,468,874
Patented Sept. 23, 1969

3,468,874
6 - TETRAZOLYLACETAMIDO PENICILLANIC AND 7-TETRAZOLYLACETAMIDO CEPHALOSPORANIC ACIDS
Rintje Raap and Raymond Urgel Lemieux, Edmonton, Alberta, Canada, assignors to R & L Molecular Research Ltd., Edmonton, Alberta, Canada, a corporation of Canada
No Drawing. Filed Apr. 10, 1967, Ser. No. 629,411
Int. Cl. C07d 99/14, 99/24
U.S. Cl. 260—239.1         12 Claims

ABSTRACT OF THE DISCLOSURE 6-tetrazolylacetamido penicillanic acids and 7-tetrazolylacetamido cephalosporanic acids and the salts thereof are new synthetic compounds of value as antibacterial agents and in the treatment of bacterial infections. In one of several processes a tetrazol-1,2 or 5-yl-acetylchloride is reacted with 6-aminopenicillanic acid or 7-aminocephalosporanic acid to produce the corresponding penicillin or cephalosporin.

BACKGROUND OF THE INVENTION

Field of the invention

This invention relates to new synthetic compounds of value as antibacterial agents, as nutritional supplements in animal feeds, as agents for the treatment of mastitis in cattle, and as therapeutic agents in poultry and animals, including man, in the treatment of infectious diseases caused by Gram-positive and Gram-negative bacteria. More particularly this invention relates to 6-tetrazolylacetamido penicillanic acids and 7-tetrazolylacetamido cephalosporanic acids and the salts thereof.

Description of the prior art

There exists a need to provide alternate and improved agents for the treatment of infections caused by Gram-positive and Gram-negative bacteria and particularly by the resistant strains of bacteria, e.g. benzylpenicillin and resistant strains of *Staphylococcus aureus* (*Micrococcus pyogenes* var. *aureus*), or for the decontamination of objects bearing such organisms, e.g. hospital equipment, walls of operating rooms and the like.

SUMMARY OF THE INVENTION

The 6-tetrazolylacetamido penicillanic acids of the present invention are compounds having the formulae

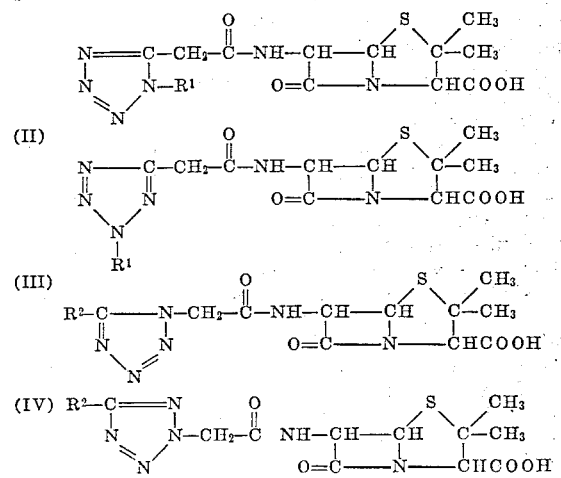

wherein $R^1$ is hydrogen or (lower)alkyl,
$R^2$ is hydrogen, chloro, bromo, iodo, fluoro, trifluoromethyl, (lower)alkyl, (lower)alkoxy, (lower)alkylthio, carboxymethoxy, (lower)alkylsulfonyl, phenyl, benzyl, phenoxy, benzyloxy, and radicals of the formula

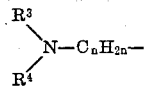

wherein $R^3$ and $R^4$ each represent hydrogen, (lower)alkyl, phenyl, benzyl, cycloalkyl having from three to seven carbon atoms inclusive, e.g. cyclopropyl, cyclobutyl, cyclopentyl, cyclohexyl and cycloheptyl, and when taken together with >N—, constitute a heterocyclic ring selected from the group consisting of pyrrolidino, piperidino, morpholino, 1,2,5,6 - tetrahydropyridino, N-(lower)alkylpiperazino and hexamethyleneimino, and $n$ is an integer from 0 to 3 inclusive;

and the nontoxic, pharmaceutically acceptable salts thereof.

The 7-tetrazolylacetamido cephalosporanic acids of the present invention are compounds having the formulae (V) 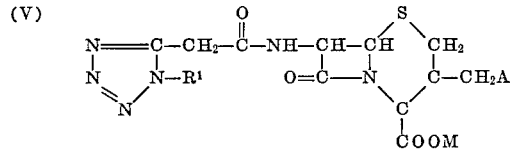

(VI) 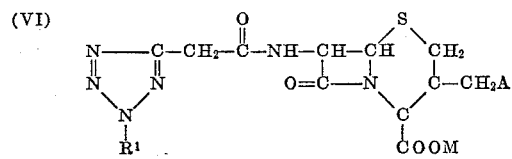

(VII) 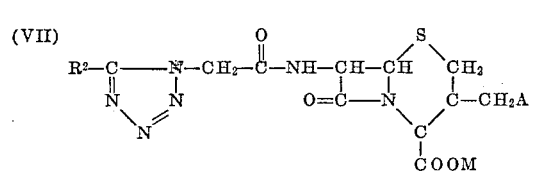

(VIII) 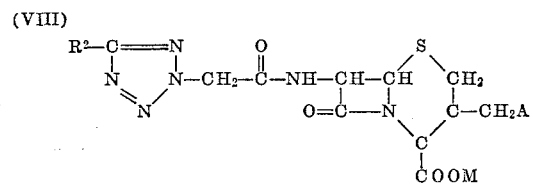

wherein $R^1$ is hydrogen or (lower)alkyl and
$R^2$ is hydrogen, chloro, bromo, iodo, fluoro, trifluoromethyl, (lower)alkyl, (lower)alkoxy, (lower)alkylthio, carboxymethoxy, (lower)alkylsulfonyl, phenyl, benzyl, phenoxy, benzyloxy, and radicals of the formula

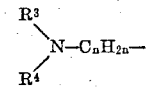

wherein $R^3$ and $R^4$ each represent hydrogen, (lower)alkyl, phenyl, benzyl, cycloalkyl having from three to seven carbon atoms inclusive, e.g. cyclopropyl, cyclobutyl, cyclopentyl, cyclohexyl and cycloheptyl, and when taken together with >N—, constitute a heterocyclic ring selected from the group consisting of pyrrolidino, piperidino, morpholino, 1,2,5,6-tetrahydropyridino, N-(lower)alkylpiperazino and hexamethyleneimino, n is an integer from 0 to 3 inclusive, A is hydrogen, hydroxyl, (lower)alkanoyloxy containing 2 to 8 carbon atoms, e.g. acetoxy, propionoyloxy, butanoyloxy, pentanoyloxy, etc., benzoyloxy, a quaternary ammonium radical, e.g. pyridinium, quinolinium, picolinium, lutidinium, or, when taken together with M, a monovalent carbon-oxygen bond, and M is hydrogen, a pharmaceutically acceptable nontoxic cation, an anionic charge when A is a quaternary ammonium radical, or when taken together with A, a monovalent carbon-oxygen bond.

For clarity, we have illustrated below the formulae of the compounds when, in Formula V, A is a quaternary ammonium radical (pyridinium) and M is an anionic charge and when A and M together are a monovalent carbon-oxygen bond.

(IX)
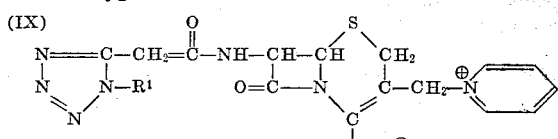

(X)
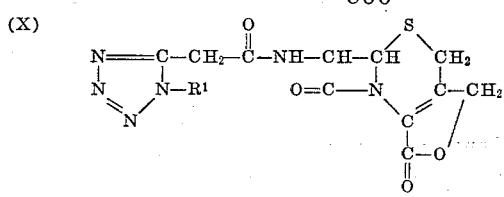

wherein

R¹ is as described above.

A preferred group of compounds of the present invention are the free acids and salts thereof having the formulae (XI)
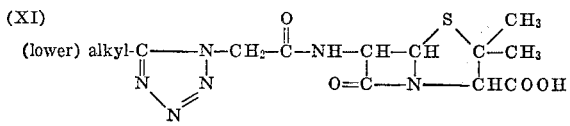

(XII)
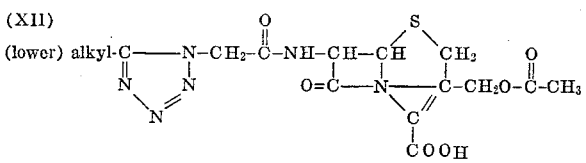

and (XIII)
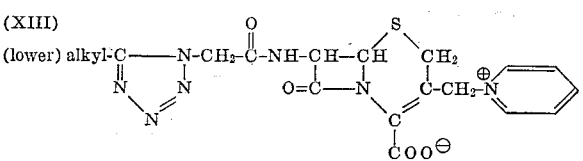

The pharmaceutically-acceptable, nontoxic cations include metallic cations such as sodium, potassium, calcium and aluminum and organic amine cations such as trialkylamines, e.g. triethylamine, procaine, dibenzylamine, N-benzyl-β-phen-ethylamine, 1-ephenamine, N,N'-dibenzylethylenediamine, dehydroabietylamine, N,N'-bis-dehydroabietylethylenediamine, N-(lower)alkylpiperidines, e.g. N-ethylpiperidine, and other amines which have been used to form salts with benzylpenicillin. The pharmaceutically acceptable salts include salts of the metals and amines listed above.

The term "(lower)alkyl" as used herein means both straight and branched chain alkyl radicals having from 1 to 8 carbon atoms, e.g. methyl, ethyl, propyl, isopropyl, butyl, isobutyl, t-butyl, amyl, hexyl, 2-ethylhexyl, etc.

Similarly, where the term "lower" is used as part of the description of another group, e.g. "(lower)alkoxy," it refers to the alkyl portion of such group which is therefore as described in connection with "(lower)alkyl."

The products of the present invention are prepared by the reaction of 6-aminopenicillanic acid or a compound of the formula (XIV)
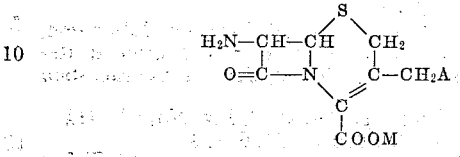

wherein

A and M are as described above (preferably in the form of a neutral salt such as the sodium salt or the triethylamine salt, i.e. when A is hydrogen, hydroxy, (lower) alkanoyloxy or benzoyloxy) with an active ester, e.g. 2,4-dinitrophenyl ester, p-nitrophenyl ester or N-hydroxysuccinimide ester, of an acid having the formulae (XV)
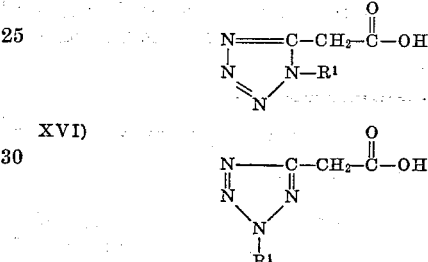

XVI)
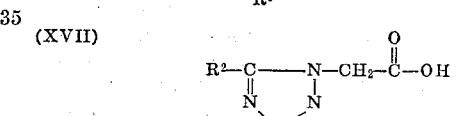

(XVII)
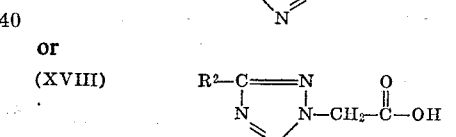

or (XVIII)

wherein

R¹ and R² are as described above or with its functional equivalent as an acylating agent for a primary amino group. Such equivalents include the corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester or thioester (e.g. with p-nitro-phenol, 2,4-dinitrophenol, thiophenol, thioacetic acid) may be used or the free acid itself may be coupled with 7-aminocephalosporanic acid after first reacting said free acid with N,N'-dimethylchloroforminium chloride [cf. Great Britain 1,008,170 and Novak and Weichet, Experientia XXI/6, 360 (1965)] or by the use of enzymes or of an N,N'-carbonyldiimidazole or an N,N'-carbonylditriazole [cf. South African patent specification 63/2684] of a carbodiimide reagent [especially N,N'-dicyclohexylcarbodiimide, N,N'-diisopropylcarbodiimide or N-cyclohexyl-N'-(2-morpholinoethyl) carbodimide; cf. Sheehan and Hess, J. Amer. Chem. Soc. 77, 1067, (1955)], or of alkynylamine reagent [cf. R. Buijle and H. G. Viehe, Angew. Chem. International Edition 3, 582 (1964)], or of a ketenimine reagent [cf. C. L. Stevens and M. E. Monk, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010

(1961)]. Another equivalent of the acid chloride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. The methods for carrying out these reactions to produce a cephalosporin and the methods used to isolate the cephalosporin so-produced are well-known in the art (cf. U.S. Patents Nos. 3,079,314, 3,117,126 and 3,129,224 and British Patents Nos. 932,644, 957,570 and 959,054).

The compounds of Formula XIV used in the present invention include 7-aminocephalosporanic acid and derivatives of 7-aminocephalosporanic acid. 7-aminocephalosporanic acid is prepared by hydrolysis of cephalosporin C and has the formula

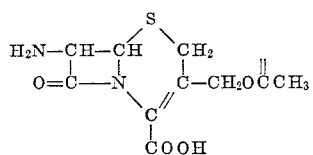

Acid hydrolysis of cephalosporin C to produce 7-aminocephalosporanic acid results in the coproduction of the lactone, 3-hydroxymethyl-7-aminodecephalosporanic acid lactone, formed by the further hydrolysis of the acetoxy group and subsequent internal esterification. The lactone has the formula

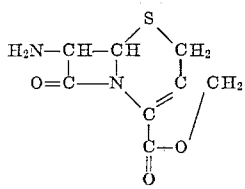

Enzymatic hydrolysis of the acetoxy group of 7-aminocephalosporanic acid results in the formation of 3-hydroxymethyl-7-aminodecephalosporanic acid having the formula

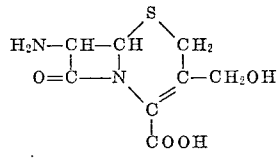

and such compound may be re-esterified with benzoic acid or a lower alkanoic acid, e.g. acetic acid, propionic acid and the like to form other esters. Preferably, re-esterification is carried out on a 3-hydroxymethyl-7-(tetrazolylacetamido)decephalosporanic acid which is obtained by enzymatic hydrolysis of a 7-(tetrazolylactamido)cephalosporanic acid.

Treatment of cephalosporin C with a tertiary amine, e.g. pyridine, lutidines, picolines and the like, followed by acid hydrolysis produces a nucleus which, in the case of pyridine, has the formula

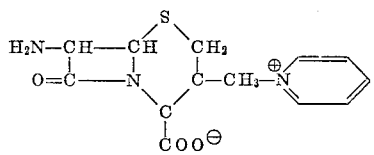

and has been given the name 3-pyridiniummethyl-7-aminodecephalosporanic acid inner salt.

The foregoing nuclei and the preparation thereof are known in the art and are described for example in U.S. Patent No. 3,117,126 and British Patents Nos. 932,644, 957,570 and 959,054.

3-methyl-7-aminodecephalosporanic acid having the formula

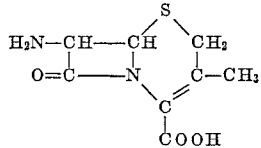

is produced by catalytic reduction of cephalosporin C followed by hydrolytic removal of the 5-aminoadipoyl side chain as described in U.S. Patent No. 3,129,224.

Starting materials

The 1,2 and 5-tetrazolylacetic acids (Formulae XV–XVIII) used in the present invention as intermediates for the preparation of the penicillins and cephalosporins of this invention are prepared as described and exemplified below.

The 5-tetrazolylacetic acids of Formulae XV and XVI are prepared according to the following reaction scheme

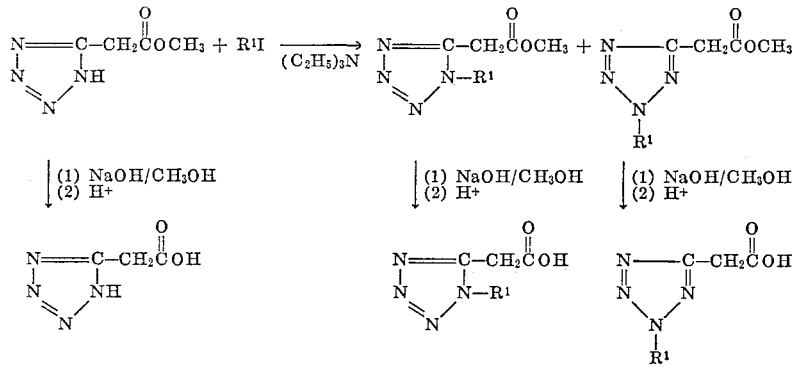

wherein

R¹ is (lower)alkyl.

A salt, e.g. triethylammonium salt of a 5-tetrazolylacetic ester such as methyl 5-tetrazolylacetic (prepared by the method of Finnegan, Henry and Lofquist, J. Am. Chem. Soc. 80, 3908 (1958) for the ethyl ester) is alkylated with a (lower)alkyl halide such as a (lower)alkyl iodide or bromide to produce a mixture of 1 and 2 (lower)alkyl-5-tetrazolylacetic esters. Preferably the reaction is carried out in a nonreactive solvent, e.g. acetone and at elevated temperature, e.g. reflux temperature. Separation of the isomers is effected by either fractional crystallization (the 2-isomers are more soluble in organic solvents than the corresponding 1-isomers) or fractional distillation. The boiling points of the 2-isomers are considerably below those of the corresponding 1-isomers. The 1- and 2-(lower)alkyl esters are hydrolysed to the acid by treatment with a base, e.g. sodium hydroxide in the presence of a nonreactive solvent, e.g. methanol followed by treatment with an aqueous acid solution, e.g. sulfuric acid. Conversion of the salt obtained by treatment with the base to the acid can also be effected by passing an aqueous solution of the salt through a column of a cation-exchange resin, e.g. Dowex 50 W-X8 H⁺ from ion-exchange resin.

For the preparation 5-tetrazolylacetic acid which exists in tautomeric forms which can be represented as follows:

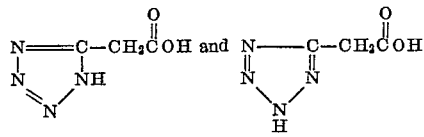

a salt, e.g. triethylammonium salt of a 5-tetrazolylacetic ester is hydrolysed to the acid by the procedure described above.

The 1- and 2-tetrazolylacetic acids of Formulae XVII and XVIII are prepared according to the following reaction scheme

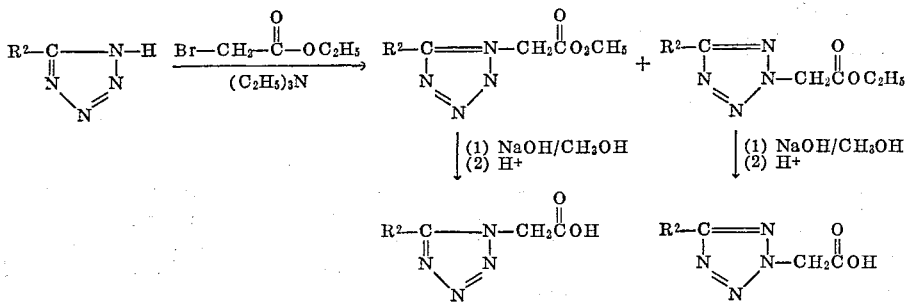

wherein

R² is as described above.

In the first step a tetrazole salt, e.g. the triethylammonium salt is alkylated with a haloacetate such as ethyl bromoacetate or methyl chloroacetate preferably in a nonreactive solvent, e.g. acetone to produce a mixture of 1- and 2-tetrazolylacetic esters. The reaction temperature is preferably from about 0-30° C. Separation of the isomers is effected by either fractional crystallization (the 2-isomers are more soluble in organic solvents than the corresponding 1-isomers) or fractional distillation. The boiling points of the 2-isomers are considerably below those of the corresponding 1-isomers. The predominance of the 1- or 2-isomer depends strongly on the R² substituent. The 1- and 2-esters are hydrolysed to the acid by treatment with a base, e.g. sodium hydroxide in the presence of a nonreactive solvent, e.g. methanol followed by treatment with an aqueous acid solution, e.g. sulfuric acid. Conversion of the salt obtained by treatment with the base to the acid can also be effected by passing an aqueous solution of the salt through a column of a cation-exchange resin, e.g. Dowex 50 W-X8 H⁻ form ion-exchange resin.

The tetrazoles used in the processes described herein for the preparation of the tetrazolylacetic acids are compounds which are either commercially available, well known in the prior art, or easily prepared in accordance with standard organic procedures previously described in the chemical literature. For example, the preparation of various tetrazoles is described by W. G. Finnegan et al., J. Am. Chem. Soc. 80, 3908 (1958) and in U.S. Patent No. 2,977,322.

The following examples will serve to illustrate this invention without limiting it thereto. All temperatures are in degree centigrade and all melting points are uncorrected.

EXAMPLE 1

(I) 5-ethyltetrazole.—This compound was prepared using the general procedure for 5-substituted tetrazoles given by W. G. Finnegan, R. A. Henry and R. Lofquist, J. Am. Chem. Soc. 80, 3908 (1958).

A mixture of propionitrile (44.0 g., 0.80 mole), sodium azide (52.0 g., 0.80 mole), ammonium chloride (42.8 g., 0.80 mole) and dimethylformamide (400 ml.) was stirred and heated on a steam bath at 95-100° for 48 hours. The reaction mixture was allowed to cool and the solid was filtered off. The solvent of the filtrate was removed under reduced pressure and the residue dissolved in 300 ml. of water. The aqueous solution was acidified with concentrated hydrochloric acid to pH 2.0 and then continuously extracted with ethyl acetate for 16 hours. The ethyl acetate solution was dried and the solvent removed to give 66.4 g. (84%) of a thick oil that slowly crystallized on cooling, M.P. 81-85°. The product was recrystallized from chloroform-carbontetrachloride (1:1) which raised the melting point to 90-91°.

(II) Ethyl 5-ethyl-1-tetrazolylacetate and ethyl 5-ethyl-2-tetrazolylacetate.—Triethylamine (62.0 g., 0.61 mole) was added to a cold solution of 5-ethyltetrazole (60.0 g., 0.61 mole) in 300 ml. of acetone. The thus obtained solution of triethylammonium 5-ethyltetrazole was cooled in ice and under stirring and efficient cooling a solution of ethyl bromoacetate (102.0 g., 0.61 mole) in 200 ml. of acetone was added in one portion. When the strongly exothermic reaction subdued the ice-bath was removed and the reaction mixture left at room temperature overnight. The triethylammonium bromide was filtered off and the acetone removed under reduced pressure. The residue was taken up in methylene chloride and the thus obtained solution washed with water. The methylene chloride solution was next dried over magnesium sulfate, whereafter the solvent was removed and the residue distilled in vacuo. There was obtained 31.3 g. (28%) of ethyl 5-ethyltetrazol-2-yl-acetate, B.P. 100-107° (1.0 mm.); and 41.6 g. (37%) of ethyl 5-ethyltetrazol-1-yl-acetate, B.P. 158-163° (1.0 mm.).

(III) 5-ethyl-1-tetrazolylactetic acid.—Ethyl 5-ethyl-tetrazol-1-yl-acetate (35.8 g., 0.195 mole) was dissolved in 100 ml. of methanol, followed by the addition of 3 N methanolic sodium hydroxide (75 ml.). An immediate exothermic reaction took place and the reaction mixture solidified almost completely. The reaction mixture was left at room temperature for one hour, whereafter most of the methanol was removed under reduced pressure. Ether (approximately 200 ml.) was added to the residue and sodium 5-ethyltetrazol-1-yl-acetate (34.5 g., 0.194 mole) was filtered off. The salt was dissolved in 70 ml. of water followed by the addition of 3 N aqueous sulfuric acid (70 ml.). The product was extracted with seven 70 ml. portions of ethyl acetate. The ethyl acetate solution was dried and then concentrated to a volume of approximately 100 ml. After the addition of 100 ml. of petroleum ether the solution was cooled. The white solid, M.P. 135–136°, was collected by filtration, recrystallized from ethyl acetate-hexane and weighed 24.6 g. (81%). Neutralization equivalent: 153 (experimental), 156 (calculated). The nuclear magnetic resonance spectrum of the potassium salt in $D_2O$ contains a methylene singlet at $\tau 4.92$, a methylene quartet at $\tau 7.10$ and a methyl triplet at $\tau 8.63$.

*Analysis.*—Calcd. for $C_5H_8N_4O_2$: C, 38.52%; H, 5.17%; N, 35.88%. Found: C, 38.65%; H, 5.40%; N, 36.22%.

(IV) 5-ethyl-2-tetrazolylacetic acid.—Ethyl 5-ethyltetrazol-2-yl-acetate (35.8 g., 0.195 mole) was dissolved in 100 ml. of methanol, followed by the addition of 3 N methanolic sodium hydroxide (75 ml.). An immediate exothermic reaction took place and the reaction mixture solidified almost completely. The reaction mixture was left at room temperature for one hour, whereafter most of the methanol was removed under reduced pressure. Ether (approximately 200 ml.) was added to the residue and sodium 5-ethyl-tetrazol-2-yl-acetate (34.5 g., 0.194 mole) was filtered off. The salt was dissolved in 70 ml. of water followed by the addition of 3 N aqueous sulfuric acid (70 ml.). The product was extracted with seven 70 ml. portions of ethyl acetate. The ethyl acetate solution was dried and then concentrated to a volume of approximately 100 ml. After the addition of 100 ml. of petroleum ether the solution was cooled. The white solid, M.P. 95–97°, was collected by filtration and recrystallized from ethyl acetate-hexane.

*Analysis.*—Calcd. for $C_5H_8N_4O_2$: C, 38.52%; H, 5.17%; N, 35.88%. Found: C, 38.69%; H, 5.29%, N, 36.21%.

EXAMPLE 2

(I) Ethyl 1- and 2-tetrazolylacetate.—An ice-cold solution of ethyl bromoacetate (40.0 g., 0.24 mole) in 100 ml. of acetone was added to a mixture of tetrazole (16.8 g., 0.24 mole) and triethylamine (24.2 g., 0.24 mole) in 100 ml. of acetone. The reaction mixture was left at 0° for 30 minutes and then allowed to come to room temperature in one hour. The triethylamine hydrobromide was filtered off and the acetone removed. The residue was dissolved in 200 ml. of methylene chloride and this solution was washed successively with small amounts of water and an aqueous bicarbonate solution. The solution was dried, followed by removal of the methylene chloride. The residue obtained was distilled in vacuo and yielded 8.4 g. (22%) of ethyl 2-tetrazolylacetate as colorless liquid, B.P. 85–87° (0.5 mm.), M.P. 49–52°. The slightly colored liquid residue could not be distilled and consisted of practically pure ethyl 1-tetrazolylacetate (20.7 g., 55%).

(II) 1-tetrazolylacetic acid.—Ethyl 1-tetrazoylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H+ form ion-exchange resin, followed by removal of the water of the eluate under reduced pressure to produce the acid. Recrystallization from ethyl acetate yielded 1-tetrazolylacetic acid M.P. 127–129°.

*Analysis.*—Calcd. for $C_3H_4N_4O_2$: C, 28.13%; H, 3.15%; N, 43.74%. Found: C, 28.31%; H, 3.31%; N, 44.01%.

(III) 2-tetrazolylacetic acid.—Ethyl 2-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H+ form ion-exchange resin, followed by removal of the water of the eluate under reduced pressure to produce the acid. Recrystallization from ethyl acetate yielded 2-tetrazolylacetic acid M.P. 175–176°.

*Analysis.*—Calcd. for $C_3H_4N_4O_2$: C, 28.13%; H, 3.15%; N, 43.74%. Found: C, 28.46%; H, 3.34%; N, 44.08%.

EXAMPLE 3

(I) Tert-butyl 1-tetrazolylacetate.—To tert-butyl isocyanoacetate (2.7 g., 0.019 mole) [Ugi et al., Ber. 94, 2814 (1961)] was added 46 ml. of a 1.6 M. solution of hydrazoic acid (0.043 mole) in benzene. The mixture was refluxed for 24 hours. The residue obtained after removal of the solvent, solidified and was recrystallized from petroleum ether-ethyl acetate (4:1) to give 2.4 g. (68%) of product, M.P. 82–84°.

(II) 1-tetrazolylacetic acid.— Tetra-butyl 1-tetrazolylacetate (10.0 g., 0.054 mole) was dissolved in 100 ml. of acetic acid and heated under reflux for 4 hours. The residue obtained after removal of the acetic acid was recrystallized from ethyl acetate to give 4.4 g. (64%) of acid, M.P. 127–129°, identical (mixture M.P. 127–129°, the infrared spectra were superimpossible) with the acid prepared from ethyl 1-tetrazolylacetate.

EXAMPLE 4

(I) Tert-butyl 5-N,N-dimethylaminomethyl-1-tetrazolylacetate.—To a suspension of dimethylamine hydrochloride (3.25 g., 0.040 mole) in 40 ml. of acetone, cooled in an ice-salt bath, was added successively 3.0 ml. of 40% aqueous formaldehyde (0.040 mole), a solution of sodium azide (2.6 g., 0.040 mole) 10 ml. of water, and finally tert-butyl isocyanoacetate (5.5 g., 0.040 mole) [Ugi et al., Ber. 94, 2814 (1961)]. The reaction mixture was stirred for 45 minutes at −10°, then for 3 hours at room temperature. After the addition of 150 ml. of water, the mixture was cooled. The product precipitated as fine white needles, which were filtered off. Yield, 6.2 g. (65%), M.P. 50–52°. Two recrystallizations from ether-n-hexane raised the melting point to 53–54°.

(II) 5-N,N-dimethylaminomethyl-1-tetrazolylacetic acid.—The tert-butyl ester (6.1 g., 0.025 mole) was dissolved in 60 ml. of acetic acid and heated under reflux for 45 minutes. The solvent was removed and the residue recrystallized from ethanol (95%)-ether to give 4.3 g. (93%) of the acid, M.P. 187–189° (dec.).

*Analysis.*—Calcd. for $C_6H_{11}N_5O_2$: C, 38.91%; H, 5.99%; N, 37.83%. Found: C, 38.98%; H, 6.00%; N, 38.40%.

EXAMPLE 5

(I) Ethyl 5-methyl-1-tertazolylacetate and ethyl 5-methyl-2-tetrazolylacetate.—A mixture of these isomers was prepared from 5-methyltetrazole (8.4 g., 0.10 mole; prepared by the general procedure as given by Finnegan, Henry and Lofquist, J. Am. Chem. Soc. 80, 3908 (1958), M.P. 139–142°), triethylamine (10.1 g., 0.10 mole) and ethyl bromoacetate (16.7 g., 0.10 mole), by the same procedure as that for ethyl 1- and 2-tetrazolylacetate. Prior to distillation, ether was added to the isomer mixture which caused ethyl 5-methyl-1-tetrazolylacetate to precipitate. This product, M.P. 75–77° was collected by filtration and amounted to 8.3 g. (49%). The residue obtained after removal of the ether was distilled in vacuo to give 3.8 g. (22%) of ethyl 5-methyl-2-tetrazolylacetate, B.P. 81–83° (1.0 mm.).

(II) 5-methyl-1-tetrazolylacetic acid.—Ethyl 5-methyl-1-tetrazolylacetate (0.010 mole was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H+ form ion-exchange resin, followed by removal of the water of the eluate under reduced pressure to produce the acid. Recrystallization from ethyl acetate yielded 5-methyl-1-tetrazolylacetic acid M.P. 184–186° (dec.).

*Analysis.*—Calcd. for $C_4H_6N_4O_2$: C, 33.81%; H, 4.26%; N, 39.43%. Found: C, 33.78%; H, 4.33%; N, 39.41%.

(III) 5 - methyl - 2 - tetrazolylacetic acid.—Ethyl 5-methyl-2-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H+ form ion-exchange resin, followed by removal of the water of the eluate under reduced pressure to produce the acid. Recrystallization from ethyl acetate-hexane yielded 5-methyl-2-tetrazolylacetic acid M.P. 155–156°.

*Analysis.*—Calcd. for $C_4H_6N_4O_2$: C, 33.81%; H, 4.26%; N, 39.43%. Found: C, 33.90%; H, 4.45%; N, 39.62%.

EXAMPLE 6

(I) Ethyl 5-n-propyl-1-tetrazolylacetate and ethyl 5-n-propyl - 2 - tertazolylacetate.—A mixture of the two isomers was prepared from 5-n-propyltetrazole (28.0 g., 0.25 mole) [W. G. Finnegan, R. A. Henry and R. Lofquist, J. Am. Chem. Soc. 80, 3908 (1958)], triethylamine (25.3 g., 0.25 mole) and ethyl bromoacetate (41.8 g., 0.25 mole) by the procedure outlined before. Upon distillation in vacuo there was obtained 13 g. (26%) of ethyl 5-n-propyl-2-tetrazolylacetate, B.P. 79–85° (0.5 mm.) and 23 g. (46%) of ethyl 5-n-propyl-1-tetrazolylacetate, B.P. 139–141° (0.5 mm.).

(II) 5 - n - propyl-1-tetrazolylacetic acid.—Ethyl 5-n-propyl-1-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. The sodium salt was dissolved in a small amount of water and this solution was acidified with dilute sulfuric acid. The acid was extracted with ethyl acetate. Recrystallization from ethyl acetate-hexane yielded 5-n-propyl-1-tetrazolylacetic acid M.P. 106–108°.

*Analysis.*—Calcd. for $C_6H_{10}N_4O_2$: C, 42.34%; H, 5.92%; N, 32.92%. Found: C, 42.35%; H, 6.12%; N, 33.12%.

(III) 5-n-propyl - 2 - tetrazolylacetic acid.—Ethyl 2-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. The sodium salt was dissolved in a small amount of water and this solution was acidified with dilute sulfuric acid. The acid was extracted with ethyl acetate. Recrystallization from benzene-hexane yielded 5-n-propyl-2-tetrazolylacetic acid M.P. 91–93°.

*Analysis.*—Calcd. for $C_6H_{10}N_4O_2$: C, 42.34%; H, 5.92%; N, 32.92%. Found: C, 42.59%; H, 5.92%; N, 33.20%.

EXAMPLE 7

(I) 5-phenyl-1-tetrazolylacetic acid and 5-phenyl-2-tetrazolylacetic acid.—To a mixture of the two isomeric esters, prepared from 5-phenyltetrazole (14.6 g., 0.1 mole) [Finnegan, Henry and Lofquist, J. Am. Chem. Soc. 80, 3908 (1958)], triethylamine (10.8 g., 0.105 mole) and ethyl bromoacetate (16.7 g., 0.1 mole), was added 50 ml. of 3 N methanolic sodium hydroxide. After the reaction mixture was left at room temperature for two hours, the methanol was removed and the salt mixture dissolved in 300 ml. of water. Upon acidification, 5-phenyl-2-tetrazolylacetic acid (14 g., 69%), M.P. 176–181° (dec.), crystallized. An analytical sample, M.P. 182–184° (dec.), was obtained after one recrystallization from ethyl acetate-n-hexane.

*Analysis.*—Calcd. for $C_9H_8N_4O_2$: C, 52.94%; H, 3.95%; N, 27.44%. Found: C, 52.48%; H, 3.96%; N, 27.41%.

The aqueous filtrate was extracted with two 100 ml. portions of ether. After drying, the ethereal solution was treated with cyclohexylamine (7 ml.). The precipitated cyclohexylamine salt was recrystallized from methanol-ether to give 1.7 g. of cyclohexylammonium 5-phenyl-1-tetrazolylacetate, M.P. 157–159° (dec.). A solution of the salt in hot water was acidified. Upon cooling pure 5-phenyl-1-tetrazolylacetic acid [1.0 g., M.P. 148–150° (dec.)] precipitated.

*Analysis.*—Calcd. for $C_9H_8N_4O_2$: C, 52.94%; H, 3.95%; N, 27.44%. Found: C, 52.58%; H, 3.85%; N, 27.50%.

EXAMPLE 8

(I) Methyl 5-trifluoromethyl - 1 - tetrazolylacetate.—A mixture of methyl azidoacetate (4.9 g., 0.043 mole; prepared by the procedure of Forster and Fierz, J. Chem. Soc. 93, 79 (1908) for the ethyl ester) and trifluoroacetonitrile (approximately 5 ml. at −70°) [Gilman and Jones, J. Am. Chem. Soc. 65, 1458 (1943)] in a 250 ml. autoclave was heated at 140–150° for 20 hours. The product was distilled in vacuo to give 7.0 g. (78%) of colorless liquid, B.P. 72–73° (0.5 mm.).

(II) 5-trifluoromethyl-1-tetrazolylacetic acid.—Methyl 5-trifluoromethyl - 1 - tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H+ form ion-exchange resin, followed by removal of the water of the eluate under reduced pressure to produce 5-trifluoromethyl-1-tetrazolylacetic acid in the form of an oil. The analysis was obtained on the amide, $C_4H_4F_3N_5O$, M.P. 146–147° (recrystallized from ethyl acetate).

*Analysis.*—Calcd. for $C_4H_4F_3N_5O$: C, 24.62%; H, 2.07%; N, 35.90%. Found: C, 25.08%; H, 2.27%; N, 36.40%.

EXAMPLE 9

(I) Ethyl 5-trifluoromethyl-2-tetrazolylacetate.—A solution of sodium 5-trifluoromethyltetrazole (20.0 g., 0.125 mole) [Norris, J. Org. Chem. 27, 3248 (1962)] and ethyl bromoacetate (20.9 g., 0.125 mole) in 75 ml. of acetone was heated under reflux for 3 hours. The mixture was worked-up in the usual manner and the product distilled in vacuo to give 21.3 g. (76%) of ethyl 5-trifluoromethyl-2-tetrazolylacetate, B.P. 72–77° (1.0 mm.), M.P. 33–37°. A n.m.r. spectrum taken prior to distillation showed the absence of any ethyl 5-trifluoromethyl-1-tetrazolylacetate.

(II) 5-trifluoromethyl-2-tetrazolylacetic acid.—Methyl 5-trifluoromethyl - 2 - tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H+ form ion-exchange resin, followed by removal of the water of the eluate under reduced pressure to produce 5-trifluoromethyl-2-tetrazolylacetic acid in the form of an oil. The analysis was obtained on the amide $C_4H_4F_3N_5O$, M.P. 115–116° (recrystallized from ethyl acetate-hexane.

*Analysis.*—Calcd. for $C_4H_4F_3N_5O$: C, 24.62%; H, 2.07%; N, 35.90%. Found: C, 24.78%; H, 2.40%; N, 36.30%.

EXAMPLE 10

(I) Ethyl 5-methylthio-1-tetrazolylacetate and ethyl 5-methylthio-2-tetrazolylacetate.—From 5-methylthiotetrazole (10.0 g., 0.086 mole) [Finnegan, Henry and Lofquist, J. Am. Chem. Soc. 80, 3908 (1958)], triethylamine (8.7 g., 0.086 mole) and ethyl bromoacetate (14.4 g., 0.086 mole) there was obtained 15.9 g. (91%) of the isomer mixture, B.P. 120–130° (0.4 mm.). According to the n.m.r. spectrum the ratio of 1- and 2-isomer was 3:5 respectively. The mixture of esters could be separated by careful fractional distillation using a spinning-band column, however much material was lost because of decomposition; ethyl 5-methylthio-1-tetrazolylacetate, B.P. 124–125° (0.3 mm.); ethyl 5-methylthio-2-tetrazolylacetate, B.P. 96–97° (0.3 mm.).

A mixture of the acids could be separated by their different solubilities in ethyl acetate. Whereas 5-methylthio-2-tetrazolylacetic acid is very soluble in this solvent at room temperature, the 1-isomer is almost completely insoluble.

(II) 5-methylthio-1-tetrazolylacetic acid.—Ethyl 5-methylthio-1-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. A solution of the sodium salt in a small amount of water was acidified with dilute sulfuric acid to produce the acid. The precipitated acid was collected by filtration. Recrystallization from ethyl acetate yielded 5-methylthio-1-tetrazolylacetic acid, M.P. 173–174° (dec.).

*Analysis.*—Calcd. for $C_4H_6N_4O_2$: C, 27.58%; H, 3.47%; N, 32.16%. Found: C, 27.60%; H, 3.66%; N, 32.00%.

(III) 5-methylthio-2-tetrazolylacetic acid.—Ethyl 5-methylthio-2-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. A solution of the sodium salt in a small amount of water was acidified with dilute sulfuric acid to produce the acid. The precipitated acid was collected by filtration. Recrystallization from chloroform yielded 5-methylthio-2-tetrazolylacetic acid, M.P. 127–129°.

*Analysis.*—Calcd. for $C_4H_6N_4O_2$; C, 27.58%; H, 3.47%; N, 32.16%. Found: C, 27.37%; H, 3.40%; N, 32.40%.

EXAMPLE 11

(I) 5-methylsulfonyltetrazole.—A mixture of 5-methylthiotetrazole (10.0 g., 0.086 mole), 30% aqueous hydrogen peroxide (22.7 ml., 0.20 mole) and glacial acetic acid (150 ml.) was allowed to react at room temperature for three days. The solvent was removed under reduced pressure and the residue recrystallized from an ethyl acetate-n-hexane (1:1) mixture to give 11.4 g. (90%) of white crystals, M.P. 127–128° (dec.). Reported, M.P. 110–120°.

(II) Ethyl 5-methylsulfonyl-2-tetrazolylacetate.—To a solution of 5-methylsulfonyltetrazole (4.0 g., 0.027 mole) in 35 ml. of acetone was added successively triethylamine (2.7 g., 0.027 mole) and ethyl bromoacetate (4.5 g., 0.027 mole). The reaction mixture was left at room temperature for two days whereafter it was worked up in the usual manner. The crude solid reaction product (a mixture of the ethyl 5-methylsulfonyl-1-tetrazolylacetate and ethyl 5-methylsulfonyl-2-tetrazolylacetate and the n.m.r. spectrum showed the predominance of the 2-isomer by at least a factor of six) was recrystallized from a benzene-n-hexane (5:2) mixture to five 3.9 g. (62%) of long white needles, M.P. 72–74°. The same product could be obtained by hydrogen peroxide oxidation of ethyl 5-methylthio-2-tetrazolylacetate.

(III) 5-methylsulfonyl-2-tetrazolylacetic acid.—Ethyl 5-methylsulfonyl-2-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. The sodium salt was dissolved in a small amount of water and this solution was acidified with dilute sulfuric acid. The acid was extracted with ethyl acetate. Recrystallization from ethyl acetate-hexane yielded 5-methylsulfonyl-2-tetrazolylacetic acid, M.P. 102–105°.

*Analysis.*—Calcd. for $C_4H_6N_4O_4S$: C, 23.31%; H, 2.93%; N, 27.18%. Found: C, 23.06%; H, 3.26%; N, 27.40%.

EXAMPLE 12

(I) Ethyl 5-amino-1-tetrazolylacetate and ethyl 5-amino-2-tetrazolylacetate.—A solution of ethyl bromoacetate (20.0 g., 0.12 mole) in 50 ml. of acetone was added to a mixture of 5-aminotetrazole monohydrate (12.4 g., 0.12 mole) [Mihina and Herbst, J. Org. Chem. 15, 1082 (1950)], triethylamine (12.1 g., 0.12 mole) and 50 ml. of acetone. Upon shaking, the mixture rapidly became homogeneous. The exothermic reaction necessitated cooling with water. When the reaction subdued the reaction mixture was left at room temperature for an additional 3 hours. The isomer mixture, obtained after filtering off the triethylamine hydrobromide and removal of the acetone from the filtrate, was dissolved in 250 ml. of warm ethyl acetate. The warm ethyl acetate solution, after washing with small amounts of water (2x) and aqueous bicarbonate (Ix), was dried, then concentrated to a volume of approximately 100 ml. Chloroform (75 ml.) was added and the mixture was kept under refrigeration overnight. The solid (10.0 g.) was filtered off and recrystallized from ethyl acetate to give 7.4 g. (36%) of ethyl 5-amino-1-tetrazolylacetate, M.P. 145–148°. The filtrate was concentrated to dryness and the solid residue (4.0 g.) was heated with 50 ml. of chloroform. Some insoluble material (1-isomer) was filtered off and 75 ml. of carbon tetrachloride was added to the filtrate. Upon cooling 2.8 g. (14%) of white crystalline ethyl 5-amino-2-tetrazolylacetate, M.P. 96–103° (could be raised to 105–107° after an additional recrystallization from carbon tetrachloride). Ethyl 5-amino-1-tetrazolylacetate upon treatment with methanolic ammonia could readily be converted to 5-amino-1-tetrazolylacetamide, M.P. 211–212° (dec.). Treatment of a solution of ethyl 5-amino-1-tetrazolylacetate in dilute hypophosphorous acid with a sodium nitrite solution at room temterature gave rise to the formation of ethyl 1-tetrazolylacetate (characterized as the amide, M.P. 150–152° (dec.)), thus indicating that the isomer assignment was correct.

(II) 5-amino-1-tetrazolylacetic acid.—Ethyl 5-amino-2-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W-X8 H+ form ion-exchange resin, followed by removal of the water of the eluate under reduced pressure to produce the acid. Recrystallization from ethyl acetate yielded 5-amino-1-tetrazolylacetic acid, M.P. 202–203 (dec.).

*Analysis.*—Calcd. for $C_3H_5N_5O_2$: C, 25.18%; H, 3.52%; N, 48.96%. Found: C, 25.22%; H, 3.65%; N, 49.22%.

(III) 5-amino-2-tetrazolylacetic acid.—Ethyl 5-amino-2-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W-X8 H+ form ion-exchange resin, followed by removal of the water of the eluate under reduced pressure to produce the acid. Recrystallization from ethyl acetate yielded 2-tetrazolylacetic acid, M.P. 185–186° (dec.). The analysis was obtained on the ethyl ester $C_5H_9N_5O_2$, M.P. 106–107°.

*Analysis.*—Calcd. for $C_5H_9N_5O_2$: C, 35.58%; H, 5.30%; N, 40.92%. Found: C, 35.20%; H, 5.14%; N, 41.18%.

EXAMPLE 13

(I) Methyl 5-amino-1-tetrazolylacetate.—Methyl chloroacetate (27.1 g., 0.25 mole) was added to a mixture of 5-aminotetrazole monohydrate (25.7 g., 0.25 mole), triethylamine (25.3 g., 0.25 mole) and 150 ml. of acetone. The resulting mixture was refluxed for one hour, then left at room temperature overnight. After cooling the solid precipitate was collected, followed by concentration of the solution to a volume of approximately 75 ml. Upon cooling some more solid precipitated. The combined solids were twice recrystallized from 200 ml. of water to give 13.9 g. (36%) of white plates, M.P. 179–181°.

(II) 5-amino-1-tetrazolylacetic acid.—Methyl 5-amino-1-tetrazolylacetate (0.010 mole was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H+ form ion-exchange resin, followed by removal of the water of the eluate under reduced pressure to produce the acid. Recrystallization from ethyl acetate yielded 1-tetrazolylacetic acid, M.P. 202–203° (dec.).

EXAMPLE 14

(I) Methyl 5-chloro-1-tetrazolylacetate and methyl 5-chloro-2-tetrazolylacetate.—Methyl chloroacetate (20.6 g., 0.20 mole) was added to a mixture of 5-chlorotetrazole (20.9 g., 0.20 mole) [R. Stolle, Ber. 62, 1118 (1929)], triethylamine (20.2 g., 0.20 mole) and 225 ml. of acetonitrile. The resulting mixture was heated under reflux for 18 hours whereafter it was worked-up in the usual manner. The product mixture was distilled in vacuo to give 22.4 g. (63%) of methyl 5-chloro-2-tetrazolylacetate, B.P. 88–92° (1.0 mm.). The distillation residue crystallized and consisted of methyl 5-chloro-1-tetrazolylacetate (6.2 g., 18%), M.P. 42–46°. When the reaction of triethylammonium tetrazole was carried out with ethyl bromoacetate in acetone at room temperature, ethyl 5-chloro-1-tetrazolylacetate, B.P. 91–93° (1.0 mm.), was obtained in 66% yield, however only 9% of the 1-isomer, M.P. 54–58°, was obtained.

The esters could be headily converted to the amides with methanolic ammonia. 5-Chloro-1-tetrazolylacetamide; M.P. 125–127°; 5-chloro-2-tetrazalylacetamide; M.P. 116–118°.

(II) 5-chloro-1-tetrazolylacetic acid.—Methyl 5-chloro-1-tetrazolyacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowes 50 W–X8 H+ form ion-exchange resin, followed by removal of the water of the eluate under reduced pressure to produce 5-chloro-1-tetrazolylacetic acid. The analysis was obtained on the amide, $C_3H_6ClN_5O$, M.P. 125–127° (recrystallized from ethyl acetate).

*Analysis.*—Calcd. for $C_3H_4ClN_5O$: C, 22.30%; H, 2.50%, N, 43.36%. Found: C, 22.94%; H, 2.95%; N, 42.80%.

(III) 5-chloro-2-tetrazolylacetic acid.—Methyl 5-chloro-2-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H+ form ion-exchange resin, followed by removal of the water of the eluate under reduced pressure to produce the acid. Recrystallization from chloroform yielded 5-chloro-2-tetrazolylacetic acid, M.P. 100–101°.

*Analysis.*—Calcd. for $C_3H_3ClN_4O_2$: C, 22.16%; H, 1.86%; N, 34.47%. Found: C, 22.36%; H, 2.11%; N, 34.70%.

EXAMPLE 15

(I) Methyl 5-bromo-1-tetrazolylacetate and methyl 5-bromo-2-tetrazolylacetate.—By using 5-bromotetrazole (0.20 mole) [R. Stolle, Ber. 62, 1118 (1929)] instead of 5-chlorotetrazole in Example 14, there was obtained 64% of methyl 5-bromo-2-tetrazolylacetate, B.P. 95–100° (0.5 mm.) and 21% of crude methyl 5-bromo-1-tetrazolylacetate.

(II) 5-bromo-1-tetrazolylacetic acid. — Methyl 5-bromo-1-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H+ form ion-exchange resin, followed by removal of the water of the eluate under reduced pressure to produce 5-bromo-1-tetrazolylacetic acid. The analysis was obtained on the amide, $C_3H_4BrN_5O$, M.P. 145–146° (dec.).

*Analysis.*—Calcd. for $C_3H_4BrN_5O$: C, 17.49%; H, 1.96%; N, 34.00%. Found: C, 17.57%; H, 1.85%; N, 34.30%.

(III) 5-bromo-2-tetrazolylacetic acid. — Methyl 5-bromo-2-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H+ form ion-exchange resin, followed by removal of the water of the eluate under reduced pressure to produce the acid. Recrystallization from chloroform yielded 5-bromo-2-tetrazolylacetic acid, M.P. 111–113°.

*Analysis.*—Calcd. for $C_3H_3BrN_4O_2$: C, 17.41%; H, 1.46%; N, 27.06%. Found: C, 17.63%; H, 1.63%; N, 26.95%.

EXAMPLE 16

(I) Methyl 1-methyl-5-tetrazolylacetate and methyl 2-methyl-5-tetrazolylacetate. — Methyl 5-tetrazolylacetate (80 g., 0.565 mole; prepared by the method of Finnegan, Henry and Lofquist, J. Am. Chem. Soc. 80, 3908 (1958) for the ethyl ester), M.P. 152–155°, and triethylamine (60 g., 0.59 mole) were dissolved in 600 ml. of acetone, followed by the addition of methyl iodide (97 g., 0.68 mole). The mixture was heated under reflux for 18 hours, whereafter the acetone was removed and the residue taken up in 400 ml. of water. This solution was made weakly alkaline with sodium carbonate, and extracted with four 100 ml. portions of methylene chloride. The oil obtained after drying and removal of the methylene chloride was distilled in vacuo to give 36 g. (41%) of methyl 2-methyl-5-tetrazolylacetate, B.P. 96–100° 2 mm.). The slightly colored distillation residue could not be distilled without decomposition and consisted of methyl 1-methyl-5-tetrazolylacetate (40 g., 45%).

(II) 1-methyl-5-tetrazolylacetic acid. — Methyl 1-methyl-5-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H⁺ form ion-exchange resin, followed by removal of the water of the eluate under reduced pressure to produce 1-methyl-5-tetrazolylacetic acid in the form of an oil. The analysis was obtained on the cyclohexylammonium salt, $C_{10}H_{19}N_5O_2$, M.P. 114–116° C.

*Analysis.*—Calcd. for $C_{10}H_{19}N_5O_2$: C, 49.74; H, 7.94%; N, 29.03%. Found C, 50.32%; H, 7.79%; N, 29.38%.

(III) 2 - methyl - 5 - tetrazolylacetic acid.—Methyl 2 - methyl-5-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H⁺ form ion-exchange resin, followed by removal of the water of the eluate under reduced pressure to produce the acid. Recrystallization from ethyl acetate-hexane yielded 2-methyl-5-tetrazolylacetic acid, M.P. 119–121°.

*Analysis.*—Calcd. for $C_4H_6N_4O_2$: C, 33.81; H, 4.26; N, 39.43. Found: C, 34.29; H, 4.25; N, 39.28.

EXAMPLE 17

(I) Methyl 1 - ethyl - 5 - tetrazolylacetate and methyl 2-ethyl-5-tetrazolylacetate.—A mixture of these isomers was obtained from methyl 5-tetrazolylacetate (28.4 g., 0.20 mole), triethylamine (22.2 g., 0.22 mole) and ethyl bromide (24.0 g., 0.22 mole) by the procedure outlined above. The product mixture was distilled in vacuo to give 19.5 g. (58%) of methyl 2-ethyl-5-tetrazolylacetate, B.P. 119–121° (4 mm.), and 10.1 g. (30%) of methyl 1-ethyl-5-tetrazolylacetate, B.P. 174–175° (4 mm.).

(II) 1 - ethyl - 5 - tetrazolylacetic acid.—Methyl 1 - ethyl-5-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H⁺ form ion-exchange resin, followed by removal of the water of the eluate under reduced pressure to produce the acid. Recrystallization from ethyl acetate-hexane yielded 1-ethyl-5-tetrazolylacetic acid, M.P. 96–98° C.

*Analysis.*—Calcd. for $C_5H_8N_4O_2$: C, 38.52%; H, 5.17%; N, 35.88%. Found: C, 38.70%; H, 4.99%; N, 35.49%.

(III) 2 - ethyl - 5 - tetrazolylacetic acid.—Methyl 2 - ethyl-5-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H⁺ form ion-exchange resin, followed by removal of the water of the eluate under reduced pressure to produce the acid. Recrystallization from ethyl acetate-hexane yielded 2-ethyl-5-tetrazolylacetic acid, M.P. 99–101°.

*Analysis.*—Calcd. for $C_5H_8N_4O$: C, 38.52%; H, 5.17%; N, 35.88%. Found: C, 38.53%; H, 5.02%; N. 35.78%.

EXAMPLE 18

(I) Methyl 1 - isopropyl - 5 - tetrazolylacetate and methyl 2-isopropyl-5-tetrazolylacetate.—A mixture of the two isomers was obtained from methyl 5-tetrazolylacetate (21.3 g., 0.15 mole), triethylamine (17.2 g., 0.17 mole) and isopropyl bromide (20.4 g., 0.17 mole) by the procedure outlined above. A vacuum distillation yielded 17.2 g. (62%) of methyl 2-isopropyl-5-tetrazolylacetate, B.P. 85–87° (0.3 mm.). The residue consisted of the 1-isomer (5.4 g., 20%).

(II) 1 - isopropyl - 5 - tetrazolylacetic acid.—Methyl 1-isopropyl-5-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. The sodium salt was dissolved in a small amount of water and this solution was acidified with dilute sulfuric acid. The acid was extracted with ethyl acetate. Recrystallization from ethyl acetate-hexane yielded 1-isopropyl - 5 - tetrazolylacetic acid, M.P. 100–101°.

*Analysis.*—Calcd. for $C_6H_{10}N_4O_2$: C, 42.34%; H, 5.92%; N, 32.92%. Found: C, 42.33%; H, 5.78%; N, 32.61%.

(III) 2 - isopropyl - 5 - tetrazolylacetic acid.—Methyl 2-isopropyl-5-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. The sodium salt was dissolved in a small amount of water and this solution was acidified with dilute sulfuric acid. The acid was extracted with ethyl acetate. Recrystallization from ethyl acetate-hexane yielded 2-isopropyl-5-tetrazolylacetic acid, M.P. 109–112°.

*Analysis.*—Calcd. for $C_6H_{10}N_4O_2$: C, 42.34%; H, 5.92%; N, 32.92%. Found: C, 42.39%; H, 6.00%; N, 32.50%.

EXAMPLE 19

(I) 5-tetrazolylacetic acid.—Methyl 5-tetrazolylacetate (0.010 mole) was dissolved in approximately 5 ml. of methanol, followed by the addition of 3 N methanolic sodium hydroxide (4 ml.). The mixture was left at room temperature for one hour, whereafter the methanol was removed. An aqueous solution of the sodium salt was passed through a column of Dowex 50 W–X8 H⁺ form ion-exchange resin, followed by removal of the water of the eluate under reduced pressure to produce the acid. Recrystallization from water-acetic acid yielded 5-tetrazolylacetic acid, M.P. 176–177°.

*Analysis.*—Calcd. for $C_3H_4N_4O_2$: C, 28.13%; H, 3.15%; N, 43.74%. Found: C, 28.27%; H, 3.18%; N, 44.00%.

EXAMPLE 20

When in the procedure of Example 1, 5-ethyltetrazole is replaced by an equal molar amount of:

5-iodotetrazole,
5-methoxytetrazole,
5-diethylaminotetrazole,
5-fluorotetrazole,
5-carboxymethoxytetrazole,
5-benzyltetrazole,
5-phenoxytetrazole,
5-benzyloxytetrazole,
5-dibenzylaminomethyltetrazole,
5-pyrrolidinomethyltetrazole,
5-morpholinomethyltetrazole,
5-piperidinomethyltetrazole,
5-1,2,5,6-tetrahydropyridinomethyltetrazole,
5-N-ethylpiperazinomethyltetrazole,
5-hexamethyleneiminomethyltetrazole,
5-benzylaminotetrazole,
5-pyrrolidinotetrazole,
5-morpholinotetrazole,
5-piperidinotetrazole,
5-1,2,5,6-tetrahydropyridinotetrazole,
5-N-methylpiperazinotetrazole,
5-hexamethyleneiminotetrazole,
5-phenethylaminotetrazole,
5-cyclopropylaminotetrazole,
5-N-benzyl-N-cyclopropylaminotetrazole,
5-cyclohexylaminotetrazole,
5-N-cyclopropyl-N-methylaminotetrazole, and
5-dimethylaminotetrazole there are obtained 5-iodo-1-tetrazolylacetic acid and 5-iodo-2-tetrazolyl-
  acetic acid,
5-methoxy-1-tetrazolylacetic acid and 5-methoxy-2-tetraz-
  olylacetic acid,
5-diethylamino-1-tetrazolylacetic acid and 5-diethylamino-
  2-tetrazolylacetic acid,
5-fluoro-1-tetrazolylacetic acid and 5-fluoro-2-tetrazolyl-
  acetic acid,
5-carboxymethoxy-1-tetrazolylacetic acid and 5-car-
  boxymethoxy-2-tetrazolylacetic acid,
5-benzyl-1-tetrazolylacetic acid and 5-benzyl-2-tetrazolyl-
  acetic acid,
5-phenoxy-1-tetrazolylacetic acid and 5-phenoxy-2-tetraz-
  olylacetic acid,
5-benzyloxy-1-tetrazolylacetic acid and 5-benzyloxy-2-
  tetrazolylacetic acid,
5-dibenzylaminomethyl-1-tetrazolylacetic acid and 5-di-
  benzylaminomethyl-2-tetrazolylacetic acid,
5-pyrrolidinomethyl-1-tetrazolylacetic acid and 5-pyrrol-
  idinomethyl-2-tetrazolylacetic acid,
5-morpholinomethyl-1-tetrazolylacetic acid and 5-mor-
  pholinomethyl-2-tetrazolylacetic acid,
5-piperidinomethyl-1-tetrazolylacetic acid and 5-piperi-
  dinomethyl-2-tetrazolylacetic acid,
5-1,2,5,6-tetrahydropyridinomethyl-1-tetrazolylacetic
  acid and
5-1,2,5,6-tetrahydropyridinomethyl-2-tetrazolylacetic
  acid,
5-N-ethylpiperazinomethyl-1-tetrazolylacetic acid and 5-
  N-ethylpiperazinomethyl-2-tetrazolylacetic acid,
5-hexamethyleneiminomethyl-1-tetrazolylacetic acid and
  5-hexamethyleneiminomethyl-2-tetrazolylacetic acid,
5-benzylamino-1-tetrazolylacetic acid and 5-benzylamino-
  2-tetrazolylacetic acid,
5-pyrrolidino-1-tetrazolylacetic acid and 5-pyrrolidino-2-
  tetrazolylacetic acid,
5-morpholino-1-tetrazolylacetic acid and 5-morpholino-2-
  tetrazolylacetic acid,
5-piperidino-1-tetrazolylacetic acid and 5-piperidino-2-
  tetrazolylacetic acid,
5-1,2,5,6-tetrahydropyridino-1-tetrazolylacetic acid and
  5-1,2,5,6-tetrahydropyridino-2-tetrazolylacetic acid,
5-N-methylpiperazino-1-tetrazolylacetic acid and 5-N-
  methylpiperazino-2-tetrazolylacetic acid,
5-hexamethyleneimino-1-tetrazolylacetic acid and 5-hexa-
  methyleneimino-2-tetrazolylacetic acid,
5-phenethylamino-1-tetrazolylacetic acid and 5-phenethyl-
  amino-2-tetrazolylacetic acid,
5-cyclopropylamino-1-tetrazolylacetic acid and 5-cyclo-
  propylamino-2-tetrazolylacetic acid,
5-N-benzyl-N-cyclopropylamino-1-tetrazolylacetic acid
  and 5-N-benzyl-N-cyclopropylamino-2-tetrazolylacetic
  acid,
5-cyclohexylamino-1-tetrazolylacetic acid and 5-cyclo-
  hexylamino-2-tetrazolylacetic acid,
5-N-cyclopropyl-N-methylamino-1-tetrazolylacetic acid
  and 5-N-cyclopropyl-N-methylamino-2-tetrazolylacetic
  acid, and
5-dimethylamino-1-tetrazolylacetic acid and 5-dimethyl-
  amino-2-tetrazolylacetic acid respectively.

EXAMPLE 21

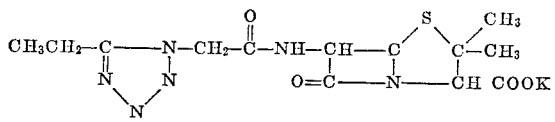

(I) p-Nitrophenyl 5-ethyl-1-tetrazolylacetate.—To an
ice-cold solution of 5-ethyl-1-tetrazolylacetic acid (14.0
g., 0.090 mole) and p-nitrophenol (14.0 g., 0.112 mole)
in dimethylformamide (100 ml.) was added N,N'-dicyclo-
hexylcarbodiimide (18.5 g., 0.090 mole). The reaction
mixture was cooled in ice for one hour, then allowed to
stand at room temperature for one hour. The precipitated
N,N'-dicyclohexylurea was filtered off and washed with
dimethylformamide (40 ml.). To the combined filtrate
and washings was carefully added 500 ml. of water,
whereafter the mixture was cooled in ice. The product
was filtered off, washed with water and air-dried to give
21.3 g. (85%) of beige colored needles melting at 123–
125°. A recrystallization from methanol raised the melt-
ing point to 127–128°.

(II) Potassium 6 - (5 - ethyl - 1 - tetrazolylacetamido)
penicillanate.—6-aminopenicillanic acid (16.7 g., 0.077
mole) was dissolved in methylene chloride (150 ml.)
containing triethylamine (15.6 g., 0.155 mole) by shak-
ing at room temperature over a period of one hour. The
solution was then cooled in ice and p-nitrophenyl 5-ethyl-
1-tetrazolyl-acetate (21.4 g., 0.077 mole) was added. The
reaction mixture was left at 0° for two hours and was
then kept at room temperature for 16 hours. Upon cool-
ing triethylammonium 6-(5-ethyl-1-tetrazolyl-acetamido)
penicillanate crystallized from the solution. After the
addition of anhydrous ether (100 ml.) the penicillin was
filtered off, washed with a methylene chloride-ether (1:1)
mixture and kept in vacuo for several hours. There was
obtained 32.1 g. (91%) of white nonhydroscopic tri-
ethylammonium 6 - (5 - ethyl - 1 - tetrazolyl-acetamido)
penicillanate. The potassium salt was prepared by dis-
solving the triethylammonium salt (32.1 g., 0.071 mole)
in methanol (50 ml.), adding a 2.4 M solution of potas-
sium 2-ethylhexanoate in n-butanol (35 ml.) followed
by dry ether (300 ml.). The penicillin was filtered off and
purified by dissolving it in methanol (500 ml.) followed
by the addition of ether (400 ml.). The solution was left
under refrigeration overnight, during which the penicillin
slowly crystallized out. The white nonhygroscopic solid
(13.6 g.) was finally kept in vacuo for 24 hours. The peni-
cillin was chemically pure as was concluded upon exami-
nation of the thin-layer chromatogram, infrared absorp-
tion spectrum and nuclear magnetic resonance spectrum.
  Analysis.—Calcd. for $C_{13}H_{17}KN_6O_4S$: C, 39.78%; H,
4.37%; N, 21.41%; S, 8.17%. Found: C, 39.75%; H,
4.66%; N, 21.65%; S, 8.13%.

The product, potassium 6-(5-ethyl-1-tetrazolylaceta-
mido) penicillanate, was found to contain the β-lactam
structure as shown by infrared analysis and to inhibit
Staph. aureus Smith at 0.031 mcg./ml., to inhibit Sal-
monella enteritidis at 1.6 mcg./ml. and E. coli at 12.5
mcg./ml. and to exhibit versus Staph. aureus Smith in
mice a $CD_{50}$ of 1.8 mg./kg. upon intramuscular adminis-
tration and versus Salmonella enteritidis in mice a $CD_{50}$
of 35 mg./kg. upon intramuscular administration.

EXAMPLE 22

Substitution of an equimolar amount of each of the
other acids produced in Examples 1 to 20, for 5-ethyl-1-
tetrazolylacetic acid gives the following products:

6-(5-ethyl-2-tetrazolylacetamido)penicillanic acid,
6-(1-tetrazolylacetamido)penicillanic acid,
6-(2-tetrazolylacetamido)penicillanic acid,
6-(5-N,N-dimethylaminomethyl-1-tetrazolylacetami-
  do)penicillanic acid,
6-(5-methyl-1-tetrazolylacetamido)penicillanic acid,
6-(5-methyl-2-tetrazolylacetamido)penicillanic acid,
6-(5-n-propyl-1-tetrazolylacetamido)penicillanic acid,
6-(5-n-propyl-2-tetrazolylacetamido)penicillanic acid,
6-(5-phenyl-1-tetrazolylacetamido)penicillanic acid,
6-(5-phenyl-2-tetrazolylacetamido)penicillanic acid,
6-(5-trifluoromethyl-1-tetrazolylacetamido)penicillanic
  acid,
6-(5-trifluoromethyl-2-tetrazolylacetamido)penicillanic
  acid,
6-(5-methylthio-1-tetrazolylacetamido)penicillanic acid,
6-(5-methylthio-2-tetrazolylacetamido)penicillanic acid,
6-(5-methylsulfonyl-2-tetrazolylacetamido)penicillanic
  acid,
6-(5-amino-1-tetrazolylacetamido)penicillanic acid,
6-(5-amino-2-tetrazolylacetamido)penicillanic acid,
6-(5-chloro-1-tetrazolylacetamido)penicillanic acid,
6-(5-chloro-2-tetrazolylacetamido)penicillanic acid, 6-(5-bromo-1-tetrazolylacetamido)penicillanic acid,
6-(5-bromo-2-tetrazolylacetamido)penicillanic acid,
6-(1-methyl-5-tetrazolylacetamido)penicillanic acid,
6-(2-methyl-5-tetrazolylacetamido)penicillanic acid,
6-(1-ethyl-5-tetrazolylacetamido)penicillanic acid,
6-(2-ethyl-5-tetrazolylacetamido)penicillanic acid,
6-(1-isopropyl-5-tetrazolylacetamido)penicillanic acid,
6-(2-isopropyl-5-tetrazolylacetamido)penicillanic acid,
6-(5-tetrazolylacetamido)penicillanic acid,
6-(5-iodo-1-tetrazolylacetamido)penicillanic acid,
6-(5-iodo-2-tetrazolylacetamido)penicillanic acid,
6-(5-methoxy-1-tetrabolylacetamido)penicillanic acid,
6-(5-methoxy-2-tetrazolylacetamido)penicillanic acid,
6-(5-diethylamino-1-tetrazolylacetamido)penicillanic acid,
6-(5-diethylamino-2-tetrazolylacetamido)penicillanic acid,
6-(5-fluoro-1-tetrazolylacetamido)penicillanic acid,
6-(5-fluoro-2-tetrazolylacetamido)penicillanic acid,
6-(5-carboxymethoxy-1-tetrazolylacetamido)penicillanic acid,
6-(5-carboxymethoxy-2-tetrazolylacetamido)penicillanic acid,
6-(5-benzyl-1-tetrazolylacetamido)penicillanic acid,
6-(5-benzyl-2-tetrazolylacetamido)penicillanic acid,
6-(5-phenoxy-1-tetrazolylacetamido)penicillanic acid,
6-(5-phenoxy-2-tetrazolylacetamido)penicillanic acid,
6-(5-benzyloxy-1-tetrazolylacetamido)penicillanic acid,
6-(5-benzyloxy-2-tetrazolylacetamido)penicillanic acid,
6-(5-dibenzylaminomethyl-1-tetrazolylacetamido)penicillanic acid,
6-(5-dibenzylaminomethyl-2-tetrazolylacetamido)penicillanic acid,
6-(5-pyrrolidinomethyl-1-tetrazolylacetamido)penicillanic acid,
6-(5-pyrrolidinomethyl-2-tetrazolylacetamido)penicillanic acid,
6-(5-morpholinomethyl-1-tetrazolylacetamido)penicillanic acid,
6-(5-morpholinomethyl-2-tetrazolylacetamido)penicillanic acid,
6-(5-piperidinomethyl-1-tetrazolylacetamido)penicillanic acid,
6-(5-piperidinomethyl-2-tetrazolylacetamido)penicillanic acid,
6-(5-1,2,5,6-tetrahydropyridinomethyl-1-tetrazolylamido)penicillanic acid,
6-(5-1,2,5,6-tetrahydropyridinomethyl-2-tetrazolylacetamido)penicillanic acid,
6-(5-N-ethylpiperazinomethyl-1-tetrazolylacetamido)-penicillanic acid,
6-(5-N-ethylpiperazinomethyl-2-tetrazolylacetamido)-penicillanic acid,
6-(5-hexamethyleneiminomethyl-1-tetrazolylacetamido)-penicillanic acid,
6-(5-hexamethyleneiminomethyl-2-tetrazolylacetamido)-penicillanic acid,
6-(5-benzylamino-1-tetrazolylacetamido)penicillanic acid,
6-(5-benzylamino-2-tetrazolylacetamido)penicillanic acid,
6-(5-pyrrolidino-1-tetrazolylacetamido)penicillanic acid,
6-(5-pyrrolidino-2-tetrazolylacetamido)penicillanic acid,
6-(5-morpholino-1-tetrazolylacetamido)penicillanic acid,
6-(5-morpholino-2-tetrazolylacetamido)penicillanic acid,
6-(5-piperidino-1-tetrazolylacetamido)penicillanic acid,
6-(5-piperidino-2-tetrazolylacetamido)penicillanic acid,
6-(5-1,2,5,6-tetrahydropyridino-1-tetrazolylacetamido)-penicillanic acid,
6-(5-1,2,5,6-tetrahydropyridino-2-tetrazolylacetamido)-penicillanic acid,
6-(5-N-methylpiperazino-1-tetrazolylacetamido)penicillanic acid,
6-(5-N-methylpiperazino-2-tetrazolylacetamido)penicillanic acid,
6-(5-N-hexamethyleneimino-1-tetrazolylacetamido)penicillanic acid,
6-(5-N-hexamethyleneimino-2-tetrazolylacetamido)penicillanic acid,
6-(5-phenethylamino-1-tetrazolylacetamido)penicillanic acid,
6-(5-phenethylamino-2-tetrazolylacetamido)penicillanic acid,
6-(5-cyclopropylamino-1-tetrazolylacetamido)penicillanic acid,
6-(5-cyclopropylamino-2-tetrazolylacetamido)penicillanic acid,
6-(5-N-benzyl-N-cyclopropylamino-1-tetrazolylacetamido)penicillanic acid,
6-(5-N-benzyl-N-cyclopropylamino-2-tetrazolylacetamido)penicillanic acid,
6-(5-cyclohexylamino-1-tetrazolylacetamido)penicillanic acid,
6-(5-cyclohexylamino-2-tetrazolylacetamido)penicillanic acid,
6-(5-N-cyclopropyl-N-methylamino-1-tetrazolylacetamido)penicillanic acid,
6-(5-N-cyclopropyl-N-methylamino-2-tetrazolylacetamido)penicillanic acid,
6-(5-dimethylamino-1-tetrazolylacetamido)penicillanic acid, and
6-(5-dimethylamino-2-tetrazolylacetamido)penicillanic acid, respectively, each of which is isolated as its water-soluble potassium salt and found to contain the β-lactam structure as shown by infrared analysis and to inhibit *Staph. aureus* Smith at low concentrations.

EXAMPLE 23

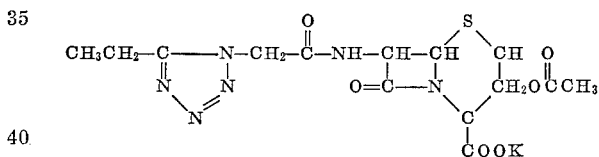

(I) p-Nitrophenyl 5-ethyl-1-tetrazolylacetate.—To an ice-cold solution of 5-ethyl-1-tetrazolylacetic acid (14.0 g., 0.090 mole) and p-nitrophenol (14.0 g., 0.112 mole) in dimethylformamide (100 ml.) was added N,N'-dicyclohexylcarbodiimide (18.5 g., 0.090 mole). The reaction mixture was cooled in ice for one hour, then allowed to stand at room temperature for one hour. The precipitated N,N'-dicyclohexylurea was filtered off and washed with dimethylformamide (40 ml.). To the combined filtrate and washings was carefully added 500 ml. of water, whereafter the mixture was cooled in ice. The product was filtered off, washed with water and air-dried to give 21.3 g. (85%) of beige colored needles melting at 123–125°. A recrystallization from methanol raised the melting point to 127–128°.

(II) Potassium 7 - (5 - ethyl - 1 - tetrazolylacetamido) cephalosporanate.—7-aminocephalosporanic acid (0.544 g., 0.002 mole) and triethylamine (0.404 g., 0.004 mole) were shaken with methylene chloride (5 ml.) at room temperature until the mixture was homogeneous. The mixture was cooled in an ice bath and 2,4-dinitrophenyl-5-ethyl-1-tetrazolylacetate (0.002 mole) was added with shaking and the resulting solution was left at room temperature for 18 hours for completion of the reaction. The reaction was followed by measuring the intensity of the amide absorption band at 1675 cm.$^{-1}$ in the infrared spectrum. The mixture was filtered and the triethylamine salt precipitated as an oil with ether (30 ml.). The oil was redissolved, in methylene chloride (5 ml.) and reprecipitated with ether (30 ml.). The solvent was decanted and the oil dissolved in methanol (4 ml.) followed by addition of potassium 2-ethylhexanoate in n-butanol (2.5 M, 1 ml.). Addition of ether (30 ml.) precipitated potassium 7 - (5-ethyl-1-tetrazolylacetamido)cephalosporanate. The precipitate was filtered, dissolved in methanol (10 ml.), reprecipitated with ether (50 ml.), filtered and dried in vacuo for 3 hours. Potassium 7-(5-ethyl-1-tetrazolylacetamido)cephalosporanate was obtained.

The product, potassium 7-(5-ethyl-1-tetrazolylacetamido)cephalosporanate, was found to contain the β-lactam structure as shown by infrared analysis and to inhibit *Staph. aureus* Smith at 0.25 mcg./ml., to inhibit *Staph. aureus* BX–1633–2 at 0.8 to 3.1 mcg./ml., to inhibit *Salmonella enteritidis* at 12.5 mcg./ml. and to exhibit versus *Staph. aureus* Smith in mice a $CD_{50}$ of 9 mgm./kg. upon intromuscular injection and a $CD_{50}$ of 7 mgm./kg. upon oral administration.

EXAMPLE 24

Substitution of an equimolar amount of each of the other acids produced in Examples 1 to 20 for 5-ethyl-1-tetrazolylacetic acid gives the following products:

7-(5-ethyl-2-tetrazolylacetamido)cephalosporanic acid,
7-(1-tetrazolylacetamido)cephalosporanic acid,
7-(2-tetrazolylacetamido)cephalosporanic acid,
7-(5-N,N-dimethylaminomethyl-1-tetrazolylacetamido) cephalosporanic acid,
7-(5-methyl-1-tetrazolylacetamido)cephalosporanic acid,
7-(5-methyl-2-tetrazolylacetamido)cephalosporanic acid,
7-(5-n-propyl-1-tetrazolylacetamido)cephalosporanic acid,
7-(5-n-propyl-2-tetrazolylacetamido)cephalosporanic acid,
7-(5-phenyl-1-tetrazolylacetamido)cephalosporanic acid,
7-(5-phenyl-2-tetrazolylacetamido)cephalosporanic acid,
7-(5-trifluoromethyl-1-tetrazolylacetamido)cephalosporanic acid,
7-(5-trifluoromethyl-2-tetrazolylacetamido)cephalosporanic acid,
7-(5-methylthio-1-tetrazolylacetamido)cephalosporanic acid,
7-(5-methylthio-2-tetrazolylacetamido)cephalosporanic acid,
7-(5-methylsulfonyl-2-tetrazolylacetamido)cephalosporanic acid,
7-(5-amino-1-tetrazolylacetamido)cephalosporanic acid,
7-(5-amino-2-tetrazolylacetamido)cephalosporanic acid,
7-(5-chloro-1-tetrazolylacetamido)cephalosporanic acid,
7-(5-chloro-2-tetrazolylacetamido)cephalosporanic acid,
7-(5-bromo-1-tetrazolylacetamido)cephalosporanic acid,
7-(5-bromo-2-tetrazolylacetamido)cephalosporanic acid,
7-(1-methyl-5-tetrazolylacetamido)cephalosporanic acid,
7-(2-methyl-5-tetrazolylacetamido)cephalosporanic acid,
7-(1-ethyl-5-tetrazolylacetamido)cephalosporanic acid,
7-(2-ethyl-5-tetrazolylacetamido)cephalosporanic acid,
7-(1-isopropyl-5-tetrazolylacetamido)cephalosporanic acid,
7-(2-isopropyl-5-tetrazolylacetamido)cephalosporanic acid,
7-(5-tetrazolylacetamido)cephalosporanic acid,
7-(5-iodo-1-tetrazolylacetamido)cephalosporanic acid,
7-(5-iodo-2-tetrazolylacetamido)cephalosporanic acid,
7-(5-methoxy-1-tetrazolylacetamido)cephalosporanic acid,
7-(5-methoxy-2-tetrazolylacetamido)cephalosporanic acid,
7-(5-diethylamino-1-tetrazolylacetamido)cephalosporanic acid,
7-(5-diethylamino-2-tetrazolylacetamido)cephalosporanic acid,
7-(5-fluoro-1-tetrazolylacetamido)cephalosporanic acid,
7-(5-fluoro-2-tetrazolylacetamido)cephalosporanic acid,
7-(5-carboxymethoxy-1-tetrazolylacetamido)cephalosporanic acid,
7-(5-carboxymethoxy-2-tetrazolylacetamido)cephalosporanic acid,
7-(5-benzyl-1-tetrazolylacetamido)cephalosporanic acid,
7-(5-benzyl-2-tetrazolylacetamido)cephalosporanic acid,
7-(5-phenoxy-1-tetrazolylacetamido)cephalosporanic acid,
7-(5-phenoxy-2-tetrazolylacetamido)cephalosporanic acid,
7-(5-benzyloxy-1-tetrazolylacetamido)cephalosporanic acid,
7-(5-benzyloxy-2-tetrazolylacetamido)cephalosporanic acid,
7-(5-dibenzylaminomethyl-1-tetrazolyacetamido) cephalosporanic acid,
7-(5-dibenzylaminomethyl-2-tetrazolylacetamido) cephalosporanic acid,
7-(5-pyrrolidinomethyl-1-tetrazolylacetamido) cephalosporanic acid,
7-(5-pyrrolidinomethyl-2-tetrazolylacetamido) cephalosporanic acid,
7-(5-morpholinomethyl-1-tetrazolylacetamido) cephalosporanic acid,
7-(5-morpholinomethyl-2-tetrazolylacetamido) cephalosporanic acid,
7-(5-piperidinomethyl-1-tetrazolylacetamido) cephalosporanic acid,
7-(5-piperidinomethyl-2-tetrazolylacetamido) cephalosporanic acid,
7-(5-1,2,5,6-tetrahydropyridinomethyl-1-tetrazolylacetamido)cephalosporanic acid,
7-(5-1,2,5,6-tetrahydropyridinomethyl-2-tetrazolylacetamido)cephalosporanic acid,
7-(5-N-ethylpiperazinomethyl-1-tetrazolylacetamido) cephalosporanic acid,
7-(5-N-ethylpiperazinomethyl-2-tetrazolylacetamido) cephalosporanic acid,
7-(5-hexamethyleneiminomethyl-1-tetrazolylacetamido) cephalosporanic acid,
7-(5-hexamethyleneiminomethyl-2-tetrazolylacetamido) cephalosporanic acid,
7-(5-benzylamino-1-tetrazolylacetamido)cephalosporanic acid,
7-(5-benzylamino-2-tetrazolylacetamido) cephalosporanic acid,
7-(5-pyrrolidino-1-tetrazolylacetamido) cephalosporanic acid,
7-(5-pyrrolidino-2-tetrazolylacetamido) cephalosporanic acid,
7-(5-morpholino-1-tetrazolylacetamido) cephalosporanic acid,
7-(5-morpholino-2-tetrazolylacetamido) cephalosporanic acid,
7-(5-piperidino-1-tetrazolylacetamido) cephalosporanic acid,
7-(5-piperidino-2-tetrazolylacetamido) cephalosporanic acid,
7-(5-1,2,5,6-tetrahydropyridino-1-tetrazolylacetamido) cephalosporanic acid,
7-(5-1,2,5,6-tetrahydropyridino-2-tetrazolylacetamido) cephalosporanic acid,
7-(5-N-methylpiperazino-1-tetrazolylacetamido) cephalosporanic acid,
7-(5-N-methylpiperazino-2-tetrazolylacetamido) cephalosporanic acid,
7-(5-hexamethyleneimino-1-tetrazolylacetamido) cephalosporanic acid,
7-(5-hexamethyleneimino-2-tetrazolylacetamido) cephalosporanic acid,
7-(5-phenethylamino-1-tetrazolylacetamido) cephalosporanic acid,
7-(5-phenethylamino-2-tetrazolylacetamido) cephalosporanic acid,
7-(5-cyclopropylamino-1-tetrazolylacetamido) cephalosporanic acid,
7-(5-cyclopropylamino-2-tetrazolylacetamido) cephalosporanic acid,
7-(5-N-benzyl-N-cyclopropylamino-1-tetrazolacetamido)cephalosporanic acid,
7-(5-N-benzyl-N-cyclopropylamino-2-tetrazolylacetamido)cephalosporanic acid,
7-(5-cyclohexylamino-1-tetrazolylacetamido) cephalosporanic acid, 7-(5-cyclohexylamino-2-tetrazolylacetamido)
 cephalosporanic acid,
7-(5-N-cyclopropyl-N-methylamino-1-tetrazolylaceta-
 mido)cephalosporanic acid,
7-(5-N-cyclopropyl-N-methylamino-2-tetrazolylaceta-
 mido)cephalosporanic acid,
7-(5-dimethylamino-1-tetrazolylacetamido)
 cephalosporanic acid, and
7-(5-dimethylamino-2-tetrazolylacetamido)
 cephalosporanic acid respectively, each of which is isolated as its water-soluble potassium salt and found to contain the β-lactam structure as shown by infrared analysis and to inhibit Staph. aureus Smith at low concentrations.

EXAMPLE 25

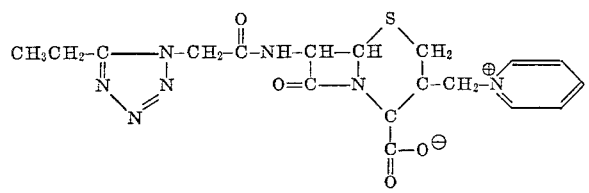

5-ethyl-1-tetrazolylacetic acid (0.002 mole) and 2,4-dinitrophenol (0.002 mole) are dissolved in dry dioxane (10 ml.) and the solution is cooled in an ice bath. N,N'-dicyclohexylcarbodiimide (0.002 mole) is added and the solution is shaken well and left at room temperature for 45 minutes. The precipitated urea is removed by filtration and washed with ethyl acetate (25 ml.). The filtrate and washings are combined and concentrated in vacuo at room temperature to leave as the residue the desired 2,4-dinitrophenyl 5 - ethyl-1-tetrazolyl - acetate.

3-pyridiniummethyl - 7 - aminodecephalosporanic acid inner salt (0.002 mole) is shaken with methylene chloride at room temperature until the mixture is homogeneous. The mixture is cooled in an ice bath and 2,4-dinitrophenyl 5 - ethyl-1-tetrazolylacetate (0.002 mole) is added with shaking and the resulting solution left at room temperature until completion of the reaction. The reaction is followed by measuring the intensity of the amide absorption band at 1675 cm.$^{-1}$ in the infrared spectrum. The mixture is filtered and addition of ether precipitates the product, 3-pyridiniummethyl - 7 - (5 - ethyl-1-tetrazolylacetamido) decephalosporanic acid inner salt. The product is dissolved in methylene chloride, reprecipitated with ether, collected, dried and found to contain the β-lactam structure as shown by infrared analysis, to inhibit Staph. aureus at low concentrations and to be highly soluble in water.

EXAMPLE 26

Pyridine (10 ml.) is added with stirring to a mixture of water (50 ml.) and 7-(5 - ethyl-1-tetrazolylacetamido) cephalosporanic acid (5 g.) to form a solution which is left under nitrogen at about 45° C. for twelve hours and then extracted four times with 20 ml. methylene chloride. The aqueous phase is concentrated in vacuo at about 30° C. and then passed through a column containing a strongly basic, anion exchange resin of the quaternary ammonium type (e.g. "Dowex 1") in the acetate cycle. The eluates containing the desired pyridine derivative as judged polarimetrically are combined, lyophilized and triturated in methanol to give solid 3-pyridiniummethyl-7-(5-ethyl-1-tetrazolylacetamido)decephalosporanic acid inner salt. By concentrating the methanol triturate at 30° C. in vacuo and then pouring the concentrate so obtained into a large volume of acetone there is precipitated an additional amount of this product.

EXAMPLE 27

Substitution of an equal volume of α-picoline, γ-picoline and 2,4-lutidine, respectively for pyridine in the procedure of Example 26 produces:

3-α-picoliniummethyl-7-(5-ethyl-1-tetrazolylacetamido) decephalosporanic acid inner salt, 3-γ-picoliniummethyl-7-(5-ethyl-1-tetrazolylacetamido) decephalosporanic acid inner salt, and
3-2',4'-lutidiniummethyl-7-(5-ethyl-1-tetrazolylaceta-
 mido)decephalosporanic acid inner salt, respectively.

EXAMPLE 28

Substitution of an equimolar amount of 3-γ-picolinium-methyl-7-aminodecephalosporanic acid inner salt for the 3-pyridinium-7-aminodecephalosporanic acid inner salt in the procedure of Example 25 produces 3-γ-picoliniummethyl - 7 - (5-ethyl - 1 - tetrazolylacetamido)decephalosporanic acid inner salt.

EXAMPLE 29

The product of Example 23 is dissolved in water and treated with acetylesterase obtained from orange peels according to the procedure of Jansen et al., Arch. Biochem. 15, 415 (1947) at pH 6 for 15 hours. The resulting solution is passed through a column containing a weak, anionic exchange resin (e.g. "Amberlite IR 4B") in the acetate form and the column is then eluted with aqueous acetic acid which has been adjusted to pH 5.5 with pyridine. The eluate is adjusted to pH 8 by the addition of sodium hydroxide and is then evaporated in vacuo to give 3-hydroxymethyl-7-(5-ethyl - 1 - tetrazolylacetamido)decephalosporanic acid in the form of its potassium salt.

EXAMPLE 30

When in Example 23 the 7-aminocephalosporanic acid is replaced by an equimolar amount of 3-methyl-7-aminodecephalosporanic acid there is obtained the potassium salt of 3-methyl-7-(5-ethyl - 1 - tetrazolylacetamido)decephalosporanic acid.

EXAMPLE 31

3-hydroxymethyl-7-aminodecephalosporanic acid lactone (0.002 mole) is shaken with methylene chloride at room temperature until the mixture is homogeneous. The mixture is cooled in an ice bath and 2,4-dinitrophenyl-5-ethyl-1-tetrazolylacetate (0.002 mole) is added with shaking and the resulting solution is held at room temperature until completion of the reaction as followed by measurement of the intensity of the amide absorption band at 1675 cm.$^{-1}$ in the infrared spectrum. After filtration, the addition of ether to the filtrate precipitates 3-hydroxymethyl-7-(5 - ethyl - 1 - tetrazolylacetamido)decephalosporanic acid lactone. The product is dissolved in methylene chloride, reprecipitated by adding ether, collected by filtration and dried.

EXAMPLE 31

7-aminocephalosporanic acid (0.001 mole) and triethylamine (0.004 mole) are shaken in methylene chloride (2 ml.) until the mixture is homogeneous. This mixture is cooled in an ice bath and 2,4-dinitrophenyl-5-ethyl-1-tetrazolylacetate (0.001 mole) dissolved in 3 ml. methylene chloride is added with shaking; the resulting solution is allowed to stand at room temperature for two hours to complete the reaction. The progress of the reaction is followed by measuring the intensity of the amide absorption band at 1675 cm.$^{-1}$ in the infrared spectrum. The addition of dry ether precipitates the triethylamine salt of 7-(5-ethyl-1-tetrazolylacetamido)cephalosporanic acid.

While the foregoing invention has been described and exemplified in terms of its preferred embodiment, those skilled in the art will appreciate that modifications can be made without departing from the spirit and scope of this invention.

What is claimed is:

1. A compound selected from the group consisting of compounds of the formulae

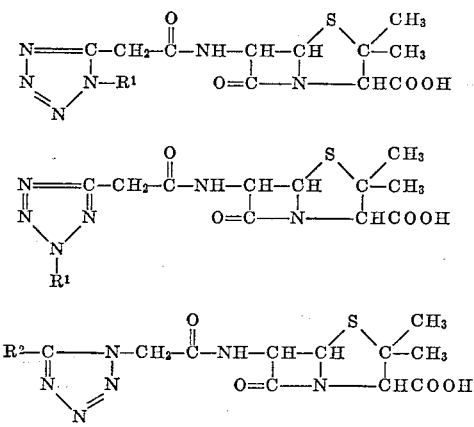

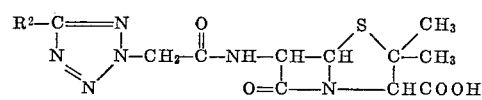

and

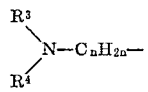

wherein

R¹ is hydrogen or (lower)alkyl

R² is hydrogen, chloro, bromo, iodo, fluoro, trifluoromethyl, (lower)alkyl, (lower)alkoxy, (lower)alkylthio, carboxymethoxy, (lower)alkylsulfonyl, phenyl, benzyl, phenoxy, benzyloxy, and radicals of the formula $$\begin{matrix}R^3\\ \diagdown\\ N-C_nH_{2n}-\\ \diagup\\ R^4\end{matrix}$$

wherein

R³ and R⁴ each represent hydrogen, (lower)alkyl, phenyl, benzyl, cycloalkyl having from three to seven carbon atoms, inclusive, and when taken together with >N—, constitute a heterocyclic ring selected from the group consisting of pyrrolidino, piperidino, morpholino, 1,2,5,6-tetrahydropyridino, N-(lower)alkylpiperazino and hexamethyleneimino and $n$ is an integer from 0 to 3 inclusive; and the nontoxic, pharmaceutically acceptable salts thereof.

2. Compounds having the formulae

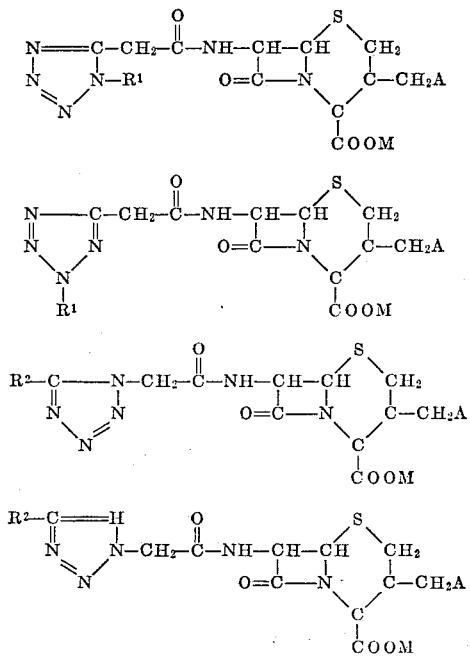

and

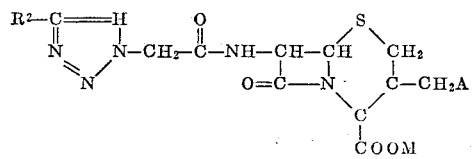

wherein

R¹ is hydrogen or (lower)alkyl and

R² is hydrogen, chloro, bromo, iodo, fluoro, trifluoromethyl, (lower)alkyl, (lower)alkoxy, (lower)alkylthio, carboxymethoxy, (lower)alkylsulfonyl, phenyl, benzyl, phenoxy, benzyloxy, and radicals of the formula

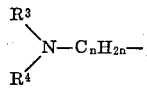

wherein

R³ and R⁴ each represent hydrogen, (lower)alkyl, phenyl, benzyl, cycloalkyl having from three to seven carbon atoms inclusive, and when taken together with >N—, constitute a heterocyclic ring selected from the group consisting of pyrrolidino, piperidino, morpholino, 1,2,5,6-tetrahydropyridino, N-(lower)alkylpiperazino and hexamethyleneimino, $n$ is an integer from 0 to 3 inclusive, A is hydrogen, hydroxyl, (lower)alkanoyloxy containing 2 to 8 carbon atoms, benzoyloxy, a quaternary ammonium radical, or, when taken together with M, a monovalent carbon-oxygen bond, and M is hydrogen, a pharmaceutically acceptable nontoxic cation, an anionic charge when A is a quaternary ammonium radical, or when taken together with A, a monovalent carbon-oxygen bond.

3. A compound of claim 1 having the formula

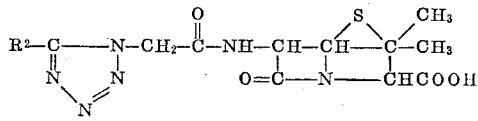

wherein

R² is hydrogen, chloro, bromo, iodo, fluoro, trifluoromethyl, (lower)alkyl, (lower)alkoxy, (lower)alkylthio, carboxymethoxy, (lower)alkylsulfonyl, phenyl, benzyl, phenoxy, benzyloxy, and radicals of the formula

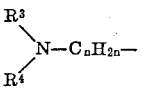

wherein

R³ and R⁴ each represent hydrogen, (lower)alkyl, phenyl, benzyl, cycloalkyl having from three to seven carbon atoms inclusive, and when taken together with >N—, constitute a heterocyclic ring selected from the group consisting of pyrrolidino, piperidino, morpholino, 1,2,5,6-tetrahydropyridino, N-(lower)alkylpiperazino and hexamethyleneimino, $n$ is an integer from 0 to 3 inclusive, and the nontoxic, pharmaceutically acceptable salts thereof.

4. A compound of claim 2 having the formula

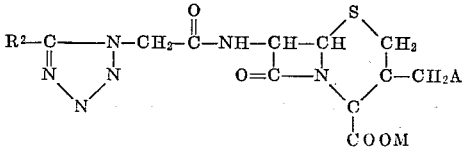

wherein

R² is hydrogen, chloro, bromo, iodo, fluoro, trifluoromethyl, (lower)alkyl, (lower)alkoxy, (lower)alkylthio, carboxymethoxy, (lower)alkylsulfonyl, phenyl, benzyl, phenoxy, benzyloxy, and radicals of the formula

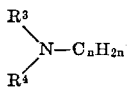

wherein

R³ and R⁴ each represent hydrogen, (lower)alkyl, phenyl, benzyl, cycloalkyl having from three to seven carbon atoms inclusive, and when taken together with >N—, constitute a heterocyclic ring selected from the group consisting of pyrrolidino, piperidino, morpholino, 1,2,5,6-tetrahydropyridino, N-(lower)alkylpiperazino, and hexamethyleneimino, $n$ is an integer from 0 to 3 inclusive, A is hydrogen, hydroxyl, (lower)alkanoyloxy containing 2 to 8 carbon atoms, benzoyloxy, a quaternary ammonium radical or, when taken together with M, a monovalent carbon-oxygen bond, and M is hydrogen, a pharmaceutically acceptable nontoxic cation, an anionic charge when A is a quaternary ammonium radical, or when taken together with A, a monovalent carbon-oxygen bond.

5. A compound of claim 1 having the formula

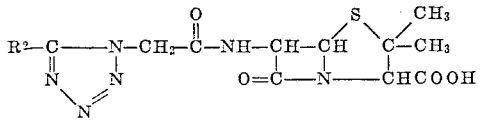

wherein $R^2$ is (lower)alkyl and
the nontoxic pharmaceutically acceptable salts thereof.

6. A compound of claim 2 having the formula

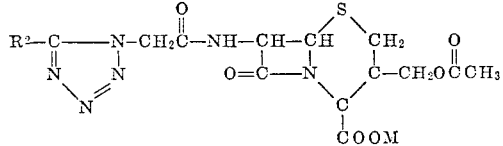

wherein $R^2$ is (lower)alkyl and
M is a nontoxic, pharmaceutically acceptable cation.

7. A compound of claim 2 having the formula

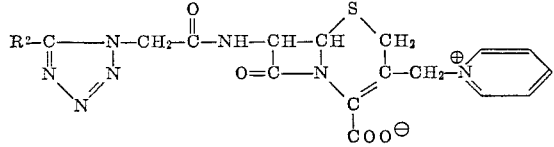

wherein $R^2$ is lower alkyl.

8. The compound of claim 1 having the formula

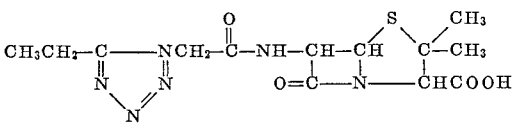

9. The compound of claim 1 having the formula

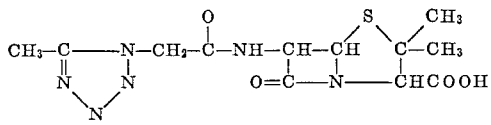

10. The compound of claim 1 having the formula

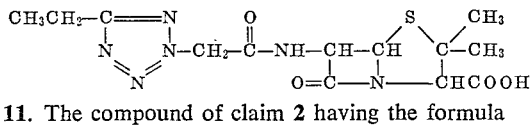

11. The compound of claim 2 having the formula

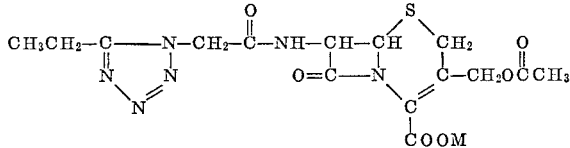

12. The compound of claim 2 having the formula

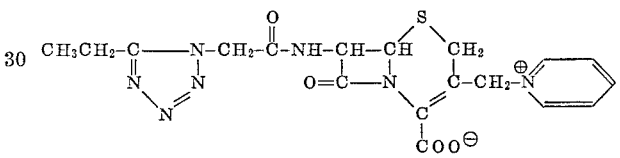

References Cited

UNITED STATES PATENTS 3,284,446   11/1966   Lemieux et al. _____ 260—239.1

NICHOLAS S. RIZZO, Primary Examiner

U.S. Cl. X.R.

260—243, 308, 999

PO-1050
(5/69)

UNITED STATES PATENT OFFICE
CERTIFICATE OF CORRECTION

Patent No. 3,468,874        Dated September 23, 1969

Inventor(s) Rintje Raap and Raymond Urgel Lemieux

It is certified that error appears in the above-identified patent and that said Letters Patent are hereby corrected as shown below:

In the claims, the second formula of claim 1 should read as follows:

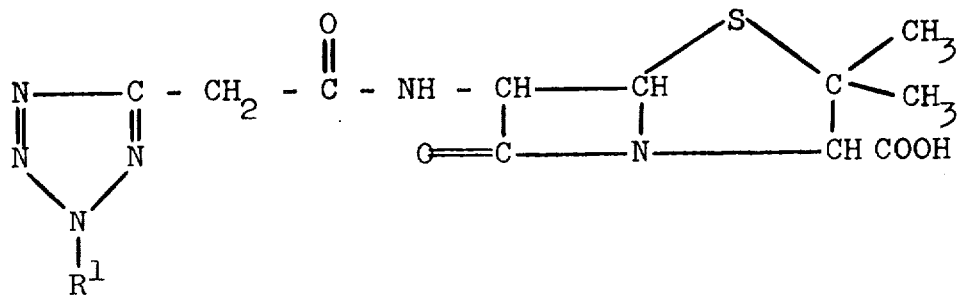

(column 27, lines 6-11)

the fourth formula of claim 2 should read as follows:

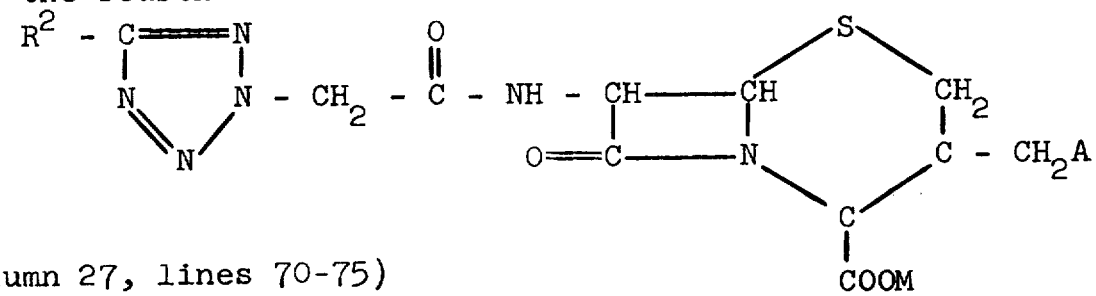

(column 27, lines 70-75)

the first formula of claim 3 should read as follows:

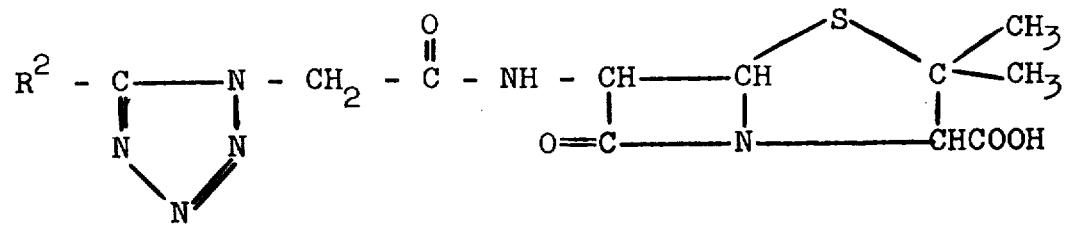

(column 28, lines 30-35)

the first formula of claim 4 should read as follows:
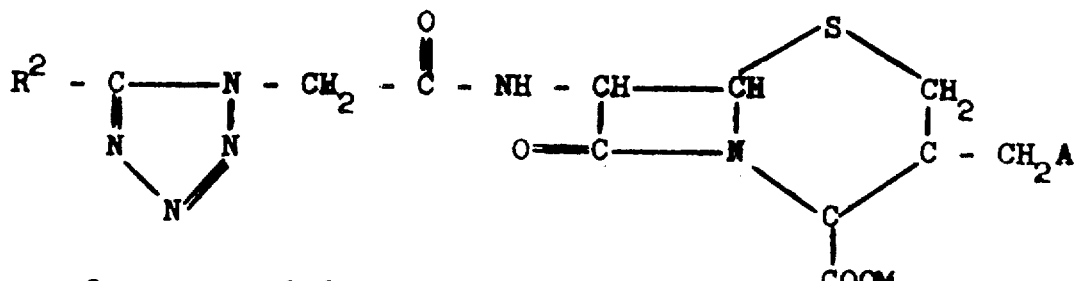
(column 28, lines 56-61)
the formula of claim 8 should read as follows:
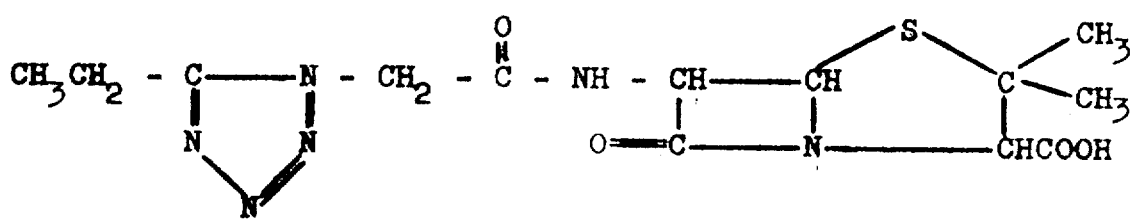
(column 30, lines 2-7)
the formula of claim 9 should read as follows:
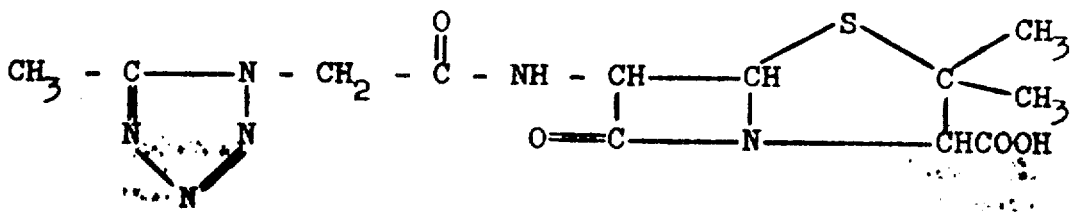
(column 30, lines 9-13)

(3)
the formula of claim 10 should read as follows:
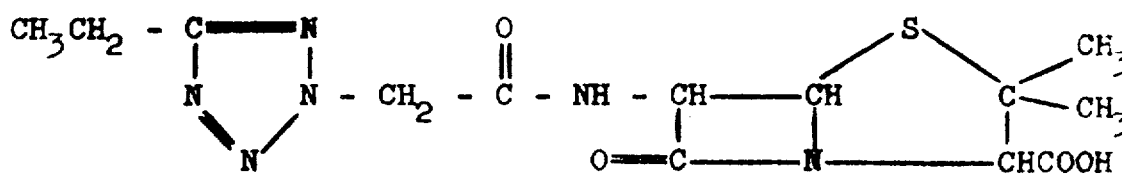
(column 30, lines 15-18)